(12) United States Patent
Jones et al.

(10) Patent No.: US 8,543,343 B2
(45) Date of Patent: Sep. 24, 2013

(54) METHOD AND APPARATUS FOR DETERMINING ENERGY SAVINGS BY USING A BASELINE ENERGY USE MODEL THAT INCORPORATES AN ARTIFICIAL INTELLIGENCE ALGORITHM

(75) Inventors: Melvin A. Jones, Duluth, GA (US); Alden M. Hathaway, Cumming, GA (US); Timothy J. Mattison, Scarsdale, NY (US); Kenneth B. Barclay, Albany, NY (US); Paul MacGregor, Alpharetta, GA (US)

(73) Assignee: Sterling Planet, Inc., Norcross, GA (US)

( * ) Notice: Subject to any disclaimer, the term of this patent is extended or adjusted under 35 U.S.C. 154(b) by 326 days.

(21) Appl. No.: 13/017,773

(22) Filed: Jan. 31, 2011
(Under 37 CFR 1.47)

(65) Prior Publication Data
US 2011/0313578 A1 Dec. 22, 2011

Related U.S. Application Data

(63) Continuation-in-part of application No. 12/235,352, filed on Sep. 22, 2008, now Pat. No. 7,881,889, and a continuation-in-part of application No. 11/613,728, filed on Dec. 20, 2006, now Pat. No. 7,519,485.

(60) Provisional application No. 60/973,984, filed on Sep. 20, 2007, provisional application No. 60/752,289, filed on Dec. 21, 2005.

(51) Int. Cl.
*G01R 21/00* (2006.01)

(52) U.S. Cl.
USPC .......................................... 702/60

(58) Field of Classification Search
USPC ............................................ 702/60, 182–185
See application file for complete search history.

(56) References Cited

U.S. PATENT DOCUMENTS

| 6,785,592 | B1 | 8/2004 | Smith et al. |
|---|---|---|---|
| 7,519,485 | B2 | 4/2009 | MacGregor |
| 7,881,889 | B2 | 2/2011 | Barclay et al. |
| 2004/0225649 | A1 | 11/2004 | Yeo et al. |
| 2005/0043862 | A1 | 2/2005 | Brickfield et al. |
| 2007/0143045 | A1 | 6/2007 | MacGregor |
| 2011/0130886 | A1* | 6/2011 | Drees et al. .................. 700/291 |

OTHER PUBLICATIONS

International Search Report and Written Opinion for application serial No. PCT/US08/77232; International Searching Authority for the USPTO; Dec. 19, 2008; 8 pages.

* cited by examiner

*Primary Examiner* — Edward Raymond
(74) *Attorney, Agent, or Firm* — Gardner Groff Greenwald & Villanueva, P.C.

(57) ABSTRACT

A computer-based system, computer-implemented method, and computer program product facilitate determining energy cost savings in an energy-consuming facility, such as a commercial building, using an artificial intelligence model, for example a neural network model, that projects or estimates the amount of energy that would have been consumed by the facility but for the implementation of energy efficiency or conservation measures. Energy savings are represented by the difference between the estimate of energy that would have been consumed but for the measures and the actual amount of energy consumed by the facility under actual conditions during a time interval after the measures have been implemented.

24 Claims, 22 Drawing Sheets

| DEPENDENT VARIABLES | INDEPENDENT VARIABLES | STATISTICAL VARIABLES |
| --- | --- | --- |
| FOR ELECTRICITY USE (KWH/DAY), OR FOR NATURAL GAS USE (BTU/DAY) | DRY BULB (AVG. DEGREES F) | HOURS ABOVE % SATURATION |
| | WET BULB (AVG. DEGREES F) | HOURS BELOW % SATURATION |
| | SOLAR RADIANCE (AVG. W/M$^2$) | |
| | OCCUPANCY (EXPRESSED IN AVG.% IF BLDG HAS OCCUPATIONAL VARIATION AND/OR MFG. PRODUCTION | |
| | PRODUCTION (UNITS/DAY, LBS/DAY, KGS/DAY, ETC.) | |

FIG. 4

| PARAMETER | SELECTION |
| --- | --- |
| DATA VARIABILITY | CLEAN DATA |
| DATA TRANSFORMATIONS | MODERATE |
| VARIABLE SUBSETS | COMPREHENSIVE |
| NETWORK TYPES | COMPREHENSIVE |

FIG. 5

| Bill Date | Temp. | Humd. | Hrs < | Hrs > | |
|---|---|---|---|---|---|
| Jan-04 | 41.44 | 36.87 | 709 | 35 | Edit |
| Feb-04 | 41.11 | 36.82 | 719 | 1 | Edit |
| Mar-04 | 54.26 | 46.38 | 551 | 169 | Edit |
| Apr-04 | 60.63 | 52.07 | 484 | 308 | Edit |
| May-04 | 69.85 | 62.75 | 137 | 583 | Edit |
| Jun-04 | 75.34 | 69.54 | 27 | 717 | Edit |
| Jul-04 | 77.35 | 70.90 | 0 | 792 | Edit |
| Aug-04 | 75.34 | 68.96 | 29 | 715 | Edit |
| Sep-04 | 72.21 | 66.21 | 72 | 720 | Edit |
| Oct-04 | 64.45 | 59.97 | 322 | 398 | Edit |

| Table Name | Description |
|---|---|
| Account | Sterling Planet Account (external to baseline DB) |
| AccountBuilding | Maps Sterling Planet Accounts to baseline buildings |
| Address | Holds addresses, including latitude and longitude |
| AddressType | Street address, billing address, etc. |
| Building | Describes buildings (client, name, description, etc.) |
| BuildingAttributes | Additional building attributes (square footage, etc.) |
| BuildingContact | Describes building contact information (email, phone, etc.) |
| BuildingForecast | Relates Buildings to previously run Forecasts (for reference only) |
| BuildingForecastAccount | Relates previously run BuildingForecasts to VendorAccounts |
| BuildingOwner | Holds Building owners and each owner's percent ownership |
| BuildingVendorAccount | Relates Buildings to VendorAccounts |
| Chart | Describes types of charts for visual output/display |
| ChartColumn | Maps ForecastColumns (model output) to chart series for display |
| ChartColumnType | Whether a ForecastColumn is used for labels or series in a Chart |
| ChartType | Chart type to display (Line, Bar, Scatter chart, etc.) |
| Client | Holds Client (names, comments, status, address, etc.) |

FIG.7

| Table Name | Description |
|---|---|
| ClientStatus | Active/Inactive/Pending, etc. |
| Contact | Contact Infomation (name, phone, email, etc.) |
| ContactType | Primary/secondary, etc. |
| Country | The country in which an address is located |
| CurrencyConversion | Currency conversion factors (recent--Dollars to Euros, etc.) |
| CurrencyType | Currency types (Dollars, Euros, etc.) |
| Division | Holds the corporate Division to which a Building is associated |
| eGRID IntensityFactor | Holds eGRID Intensity factors by year |
| eGRID Subregion | Holds eGRID subregion names (SERC South, SPP North, etc.) |
| ErrorLog | Contains processing/debugging/tracing information (not yet used) |
| Forecast | Records user-entered data per forecast run (hrs above, hrs below, etc.) |
| ForecastColumn | Describes forecast columns (for internal processing and display) |
| ForecastRank | Official or Unofficial. (Official means all Building energy savings are Compared to this Baseline and is locked-in.) |
| ForecastType | Electric, Electric Peak, Gas, etc. |
| ForecastOutput | Contains the output of a forecast |
| NERC Region | Holds NERC regions (SERC, SPP, ERCOT, etc.) |
| NERC Subregion | Holds NERC subregions (ECOV, ECRT, MAPP, etc.) |
| Plant | Holds Plant data (emissions, capacity, etc., from eGRID spreadsheet) |

FIG. 8A

| Table Name | Description |
|---|---|
| point_data | Holds Hourly data received from meters for Regions where peak usage is of concern. |
| Region | Holds states, provinces, etc. |
| Salutation | Mr., Ms., Mrs., etc. |
| SectorType | Holds Sector types (Electric, Gas, Fuel Oil, Steam, etc.) |
| UnitOfMeasure | Holds units of measure (kW, kWh, ccf, BTU, Gallons, etc.) |
| UOM Conversion | Unit of measure conversion factors |
| URL | Holds URLs (addresse, port, filename, login, password, etc.) |
| URL FileFormat | Holds URL string formatting instructions |
| Vendor | Holds Vendor descriptions (building energy suppliers) |
| VendorAccount | Holds Vendor Accounts |
| VendorAccountDefinition | Describes Vendor Accounts |
| VendorBill | Holds Vendor Bills (start date, end date, bill number, etc.) |
| VendorCharge | Holds billing data (consumption, service amount, etc.) |
| VendorChargeType | Holds Charge Types (Demand, Consumption, Adjustments, etc.) |
| WeatherData | Holds hourly weather data (temperature, humidity, timestamp, etc.) |
| WeatherFlag | Observed, Calculated, or from secondary observation site) |
| WeatherFlagType | Temperature, Humidity, etc. |
| WeatherStation | Holds Weather Station (name, latitude, longitude, elevation, etc.) |

FIG.8B

ELECTRIC

| Bill End | Avg DB Temp | Avg WB Temp | Hours T< | Hours T> | Actual kWh |
|---|---|---|---|---|---|
| 2/7/03 | 44.86 | 39.12 | 652.00 | 20.00 | 175,600 |
| 3/10/03 | 54.79 | 50.58 | 654.00 | 90.00 | 209,400 |
| 4/10/03 | 62.27 | 56.70 | 486.00 | 258.00 | 224,600 |
| 5/8/03 | 70.08 | 63.10 | 241.00 | 431.00 | 224,600 |
| 6/9/03 | 74.77 | 68.33 | 61.00 | 707.00 | 285,600 |
| 7/8/03 | 77.79 | 72.54 | 0.00 | 696.00 | 268,200 |
| 8/7/03 | 77.12 | 73.28 | 0.00 | 720.00 | 279,800 |
| 9/10/03 | 77.91 | 73.34 | 14.00 | 802.00 | 332,000 |
| 10/8/03 | 71.18 | 64.63 | 182.00 | 490.00 | 246,800 |
| 11/7/03 | 68.45 | 65.51 | 159.00 | 561.00 | 253,400 |
| 12/8/03 | 55.14 | 50.03 | 605.00 | 139.00 | 227,400 |
| 1/9/04 | 48.46 | 43.62 | 713.00 | 55.00 | 225,800 |
| 2/9/04 | 47.71 | 41.73 | 696.00 | 48.00 | 222,000 |
| 3/9/04 | 54.27 | 49.37 | 604.00 | 92.00 | 212,200 |
| 4/8/04 | 61.33 | 51.54 | 486.00 | 234.00 | 225,800 |
| 5/7/04 | 67.00 | 59.16 | 346.00 | 350.00 | 241,600 |
| 6/9/04 | 75.79 | 69.01 | 47.00 | 745.00 | 321,000 |
| 7/8/04 | 78.05 | 72.79 | 3.00 | 693.00 | 298,400 |
| 8/10/04 | 80.41 | 72.98 | 2.00 | 790.00 | 292,600 |
| 9/9/04 | 77.44 | 71.38 | 18.00 | 702.00 | 246,200 |
| 10/7/04 | 73.70 | 67.77 | 116.00 | 556.00 | 215,800 | where Saturation Temperature = 66.5

FIG. 12

ELECTRIC

| Bill End | Baseline Forecast (kWh) | Actual (kWh) | Error |
|---|---|---|---|
| 2/7/03 | 175,598 | 175,600 | 0.00% |
| 3/10/03 | 209,539 | 209,400 | 0.07% |
| 4/10/03 | 223,353 | 224,600 | 0.56% |
| 5/8/03 | 225,209 | 224,600 | 0.27% |
| 6/9/03 | 285,447 | 285,600 | 0.05% |
| 7/8/03 | 267,895 | 268,200 | 0.11% |
| 8/7/03 | 279,687 | 279,800 | 0.04% |
| 9/10/03 | 332,044 | 332,000 | 0.01% |
| 10/8/03 | 244,824 | 246,800 | 0.80% |
| 11/7/03 | 253,649 | 253,400 | 0.10% |
| 12/8/03 | 227,053 | 227,400 | 0.15% |
| 1/9/04 | 225,303 | 225,800 | 0.22% |
| 2/9/04 | 221,929 | 222,000 | 0.03% |
| 3/9/04 | 212,513 | 212,200 | 0.15% |
| 4/8/04 | 225,423 | 225,800 | 0.17% |
| 5/7/04 | 242,182 | 241,600 | 0.24% |
| 6/9/04 | 320,875 | 321,000 | 0.04% |
| 7/8/04 | 298,354 | 298,400 | 0.02% |
| 8/10/04 | 292,306 | 292,600 | 0.10% |
| 9/9/04 | 246,212 | 246,200 | 0.00% |
| 10/7/04 | 215,543 | 215,800 | 0.12% |

| | |
|---|---|
| Average Monthly Error | 0.15% |
| Weighted Total Error | 0.07% |

|    | From   | To     | Amount |
|----|--------|--------|--------|
| 1) | Date 1 | Date 2 | N |
| 2) | Date 3 | Date 4 | O |
| 3) | Date 5 | Date 6 | P |
| 4) | Date 7 | Date 8 | Q |

↓ n datums

⟹

|     | From   | To     | Amount        | Notes |
|-----|--------|--------|---------------|-------|
| 1)  | Date 1 | Date 2 | N             | Raw   |
| 2)  | Date 1 | Date 4 | N + O         |       |
| 3)  | Date 1 | Date 6 | N + O + P     |       |
| 4)  | Date 1 | Date 8 | N + O + P + Q |       |
| 5)  | Date 3 | Date 4 | O             | Raw   |
| 6)  | Date 3 | Date 6 | O + P         |       |
| 7)  | Date 3 | Date 8 | O + P + Q     |       |
| 8)  | Date 5 | Date 6 | P             | Raw   |
| 9)  | Date 5 | Date 8 | P + Q         |       |
| 10) | Date 7 | Date 8 | Q             | Raw   |

↓ ½ ($n^2$ + n) total datums

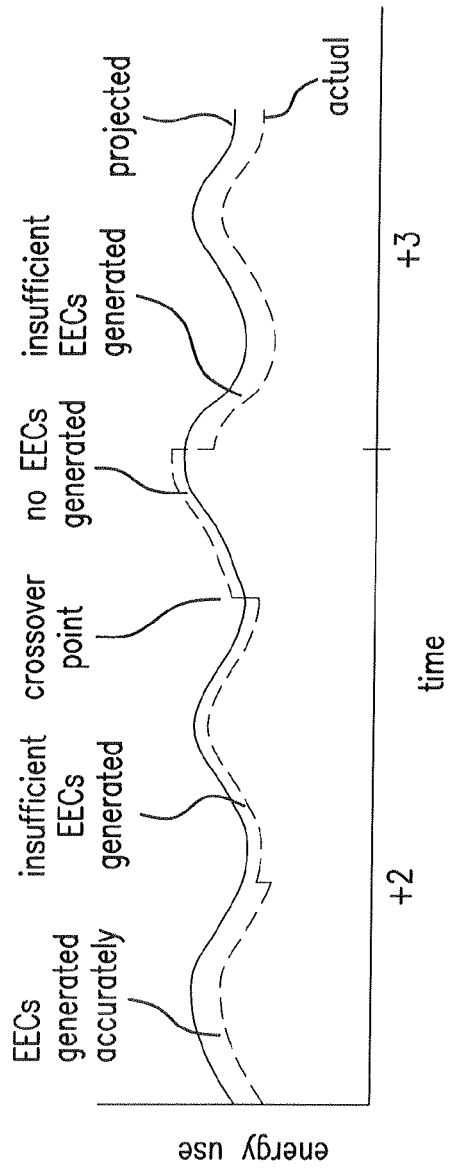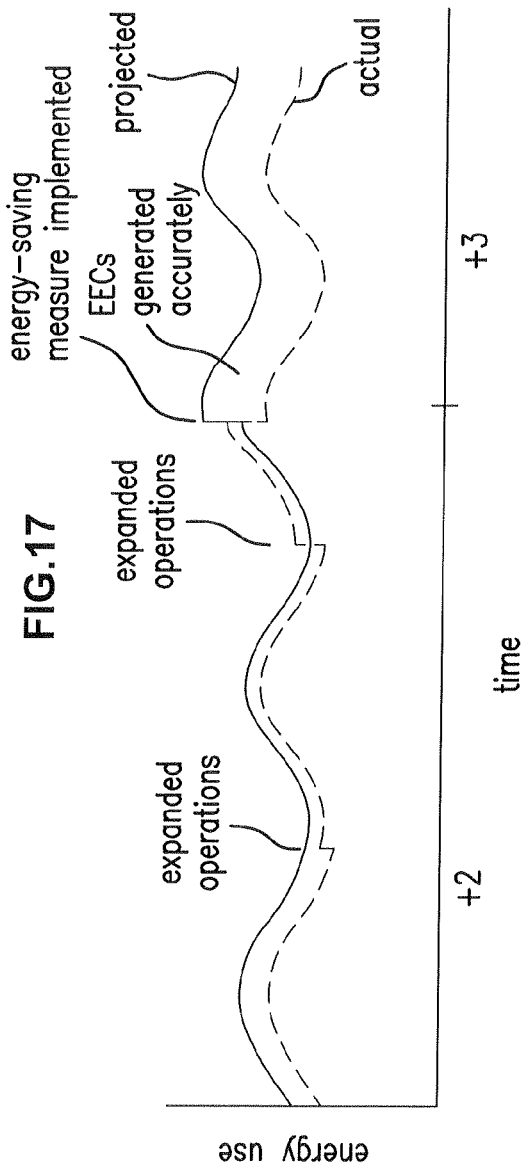

Carbon Dioxide Factors

— 74

| State | Average Carbon Dioxide Emissions Rate (pounds per kWh produced)[1] | Average Electricity Rate ($ per kWh)[2] |
|---|---|---|
| AK | 1.106 | 0.1330 |
| AL | 1.299 | 0.0800 |
| AR | 1.280 | 0.0800 |
| AZ | 1.219 | 0.0886 |
| CA | 0.700 | 0.1251 |
| CO | 1.986 | 0.0906 |
| CT | 0.754 | 0.1364 |
| DC | 3.614 | 0.0910 |
| DE | 1.804 | 0.0901 |
| FL | 1.348 | 0.0962 |
| GA | 1.388 | 0.0864 |
| HI | 1.655 | 0.2070 |
| IA | 1.943 | 0.0927 |
| ID | 0.144 | 0.0629 |
| IL | 1.155 | 0.0834 |
| IN | 2.098 | 0.0750 |
| KS | 1.871 | 0.0790 |
| KY | 2.051 | 0.0657 |
| LA | 1.201 | 0.0887 |
| MA | 1.226 | 0.1344 |
| MD | 1.293 | 0.0846 |
| ME | 0.772 | 0.1323 |
| MI | 1.413 | 0.0840 |
| MN | 1.588 | 0.0828 |
| MO | 1.881 | 0.0708 |
| MS | 1.409 | 0.0871 |
| MT | 1.573 | 0.0810 |
| NC | 1.218 | 0.0865 |
| ND | 2.386 | 0.0699 |
| NE | 1.503 | 0.0714 |
| NH | 0.779 | 0.1351 |
| NJ | 0.713 | 0.1174 |
| NM | 1.992 | 0.0913 |
| NV | 1.573 | 0.1020 |
| NY | 0.907 | 0.1572 |
| OH | 1.779 | 0.0851 |
| OK | 1.726 | 0.0795 |
| OR | 0.456 | 0.0725 |
| PA | 1.216 | 0.0986 |
| RI | 1.071 | 0.1304 |
| SC | 0.915 | 0.0867 |
| SD | 1.215 | 0.0777 |
| TN | 1.266 | 0.0698 |
| TX | 1.472 | 0.1093 |
| UT | 2.121 | 0.0752 |
| VA | 1.211 | 0.0816 |
| VT | 0.007 | 0.1296 |
| WA | 0.360 | 0.0654 |
| WI | 1.713 | 0.0966 |
| WV | 1.988 | 0.0621 |
| WY | 2.278 | 0.0748 |
| U.S. Average | 1.363 | 0.0945 |

[1] US Environmental Protection Agency eGRID2006 Version 2.1, April 2007
[2] US Department of Energy, Energy Information Administration, Average Retail Price for Bundled and Unbundled Consumers by Sector, Census Division and State, 2005

FIG. 22

METHOD AND APPARATUS FOR DETERMINING ENERGY SAVINGS BY USING A BASELINE ENERGY USE MODEL THAT INCORPORATES AN ARTIFICIAL INTELLIGENCE ALGORITHM

CROSS-REFERENCE TO RELATED APPLICATIONS

This patent application is a continuation-in-part of U.S. Non-Provisional patent application Ser. No. 12/235,352 filed Sep. 22, 2008, which claims the priority benefit of U.S. Provisional Patent Application Ser. No. 60/973,984 filed Sep. 20, 2007, and which is a continuation-in-part of U.S. Non-Provisional patent application Ser. No. 11/613,728 filed Dec. 20, 2006, which claims the priority benefit of U.S. Provisional Patent Application Ser. No. 60/752,289 filed Dec. 21, 2005, the entire scope and content of all of which are hereby incorporated herein for all purposes.

TECHNICAL FIELD

The invention relates to determining energy savings and, more particularly, to determining energy savings by using an artificial intelligence-based energy use model to calculate a building's baseline energy use, and for determining energy savings from the baseline energy use calculation.

BACKGROUND OF THE INVENTION

When implementing energy efficiency and conservation measures such as, for example, infrastructure changes, operational modifications, equipment retrofits and new energy management technologies in buildings in order to reduce energy use and thus energy costs, there has always been an issue of determining the "true" savings. Traditionally, two approaches have been utilized to determine energy savings for buildings, namely, high-level statistical correlation models using monthly degree-days and detailed facility models incorporating all on-site equipment and building parameters.

While degree-day models may be implemented off-site with historical data consisting of only monthly degree-days and energy bills and utilizing statistical regression models, these models have proven to be fairly inaccurate. Conversely, facility models have proven to be very accurate, but these models, such as DOEII, are very complex and require an extensive on-site evaluation of building design parameters, such as, for example, window coverage, directional orientation, insulation, and equipment, such as chillers, boilers, HVAC systems, lighting and motors. As a result, these models have been proven to be impractical in terms of time and cost for use with a portfolio of buildings, especially dispersed across a large geographic region.

As a consequence, without a timely, low-cost and accurate method to determine the true savings in energy and cost from energy efficiency and conservation measures, traditional performance contracts and new tradable conservation attribute markets have been difficult to implement.

This new tradable commodity, known as an Energy Efficiency Certificate (EEC), also sometimes referred to as an Energy Efficiency Credit, Energy Savings Certificate, and White Certificate, represents the value of energy not used at a building through the implementation of energy efficiency and conservation projects. Several U.S. states have passed legislation specifying that tradable EECs may be used to meet mandates for reducing energy generated in their state. In these states, the electricity suppliers may purchase EECs equivalent to a percentage of their total annual retail sales, such as 4% by 2010 in the state of Connecticut. Not only do electricity suppliers in these "mandated" states purchase EECs, but many businesses, governmental agencies and educational institutions also purchase EECs voluntarily to reduce indirect Greenhouse Gas (GHG) emissions. Since an EEC has the environmental attributes of avoided air emissions including $SO_2$, NOx and $CO_2$ associated with it in accordance with the location of the energy reduction, an EEC may be purchased to reduce indirect $CO_2$ emissions. In the case of the former, states with mandates, EECs are certified by the states, usually under the direction of the public utility commissions. In the case of the latter, voluntary transactions, EECs are certified by non-profit certification organizations such as Environmental Resources Trust, Inc. (ERT). In either case, the key issue for certification is Measurement and Verification (M&V) of the energy savings derived from the energy efficiency or conservation project. The M&V process must be both highly accurate and low cost in order for the EEC market to fully develop and expand across customer classes.

It would be desirable to provide a computer-based system, computer-implemented method and computer program product for accurately determining true savings in energy and cost that is practical to implement and cost effective. The present invention addresses such problems and deficiencies and others in the manner described below.

SUMMARY OF THE INVENTION

The present invention relates to determining energy cost savings in an energy-consuming facility, such as a commercial building or group of such buildings, using an artificial intelligence model, for example a neural network model, that projects or estimates the amount of energy that would have been consumed by the facility but for the implementation of energy efficiency or conservation measures. Energy savings are represented by the difference between the estimate of energy that would have been consumed but for the measures and the actual amount of energy consumed by the facility under actual conditions during a time interval after the measures have been implemented.

In an exemplary embodiment of the invention, a computing system operating under control of suitable software is used to perform the method. In accordance with the method, baseline facility condition data is input to an artificial intelligence model generator, for example a neural network model generator. The baseline facility condition data represents baseline conditions experienced by the facility during a first time interval before energy conservation measures. The baseline facility conditions include at least weather conditions experienced by the facility. In some embodiments of the invention, the baseline facility conditions can further include facility occupancy data, representing the extent to which the facility is fully or partially occupied, and production or manufacturing data, representing the extent to which the facility is fully or partially engaged in its normal operations.

Baseline energy consumption data is also input to the neural network model generator. The baseline energy consumption data represents the amount of energy consumed by the facility during the first time interval. In some embodiments of the invention, such baseline facility condition data and corresponding baseline energy consumption data can be input for a plurality of such time intervals, such as on a per-month basis. For example, baseline facility condition data and corresponding baseline energy consumption can be input for each of 36 months.

In response to the baseline facility condition data and corresponding baseline energy consumption data, the neural network model generator generates a neural network model. The model is a neural network that represents or models how facility energy consumption responds to facility conditions.

Once the model has been generated, it is used to predict or estimate the amount of energy that would have been consumed by the facility but for the implementation of energy efficiency or conservation measures. Actual facility condition data, representing actual facility conditions during a second time interval after the energy conservation measures have been implemented, is input to the model. The actual facility condition data can be of the same types as described above with regard to the baseline facility condition data. For example, in an embodiment of the invention in which the baseline facility condition data consists of weather data, the actual facility condition data can correspondingly consist of weather data.

Because the neural network model was generated based upon the baseline facility condition data and baseline energy consumption, then in response to the actual facility condition data the neural network model outputs an estimate of the amount of energy that would have been consumed during the second time interval (under the actual facility conditions) but for the energy conservation measures.

Energy savings can then be computed. Energy savings can be defined by the difference between the actual energy consumed during the second time interval and the estimate of energy that would have been consumed during the second time interval but for the energy conservation measures. By determining energy savings with great accuracy and efficacy, this invention enables the creation and certification in accordance with regulatory agencies of tradable attributes, known as Energy Efficiency Certificate (EECs), derived from implementing energy efficiency and conservation projects.

In addition, other exemplary embodiments provide new computer-based systems, computer-implemented methods, and computer program products that provide additional features. One embodiment includes data-expansion pre-processing that includes combining raw energy-consumption datums for individual time periods into a greater number of total energy-consumption datums. In this way, more training data is input, which results in a better-trained, more accurate neural network model. Another embodiment includes model-updating post-processing that includes repeating the energy-savings-determining method with updated facility condition data. This permits energy savings to be recognized from additional energy-saving measures and at the same time more accurately generates EECs even when overall facility energy use increases due to expanded operations and usage creep. And still another embodiment includes a system-based method for determining EECs that is similar to the facility-based method but instead is based on individual energy-using systems. With this method, small energy savings in a large facility can be more readily and accurately projected.

In other exemplary embodiments of the present invention, there are provided new computer-based systems, computer-implemented methods, and computer program products that provide for more accurate and/or geographically precise estimates of energy savings. These systems and methods of these embodiments can be used effectively to provide a lower-level granularity for large facilities or individual systems. In one such exemplary embodiment, the estimated energy savings are converted to particulate reduction values (such as carbon dioxide reduction values (CRVs)) based on the differing value of reductions in particulates by geographic region. In another exemplary embodiment, the energy savings are estimated at a more granular level based on additional facility conditions and can include weather data, type of use, occupancy, production data, number of shifts, hours of operation, sales units, and/or sales. And in yet another exemplary embodiment, the systems and methods provide for estimating and displaying estimated energy savings on a less-than-monthly (e.g., hourly) basis and specially designating those energy savings that occur at increased demand times.

Accordingly, the present invention provides a number of advantages over prior systems and methods. In particular, practical applications of various of the systems and methods of the present invention can provide for measurement and verification of energy savings, substantially real-time energy pricing, time-of-day energy pricing, energy load management and demand response.

The specific techniques and structures employed by the invention to improve over the drawbacks of the prior methods and accomplish the advantages described herein will become apparent from the following detailed description of the exemplary embodiments of the invention and the appended drawings and claims.

BRIEF DESCRIPTION OF THE DRAWINGS

FIG. 4 is an exemplary table summarizing the baseline data that forms the input data for the neural network model generator.

FIG. 5 is an exemplary table summarizing neural network parameters and their selections in the exemplary embodiment.

FIG. 7 illustrates an exemplary database table structure.

FIG. 8 is a continuation sheet of FIG. 7.

FIG. 12 is an exemplary table of baseline facility condition data and baseline energy consumption data.

FIG. 13 is an exemplary table of output data produced by the model.

FIG. 16 is a table illustrating four raw datums expanded to ten total datums, which include the raw datums and new combined datums generated from the raw datums by a data-expanding pre-process.

FIG. 17 graphically illustrates how a facility's actual energy usage creeps up over time due to expanded operations, while the projected energy usage based on outdated facility condition data does not.

FIG. 18 graphically illustrates the projected energy usage of the facility of FIG. 17 increasing, as determined by a post-process that generates an updated energy use model based on updated facility condition data.

FIG. 22 depicts a table of data, stored in the database, including carbon dioxide factors for use in converting the energy savings of FIG. 20 to the carbon dioxide impact of FIG. 21.

DETAILED DESCRIPTION OF EXEMPLARY EMBODIMENTS

Figure 1:
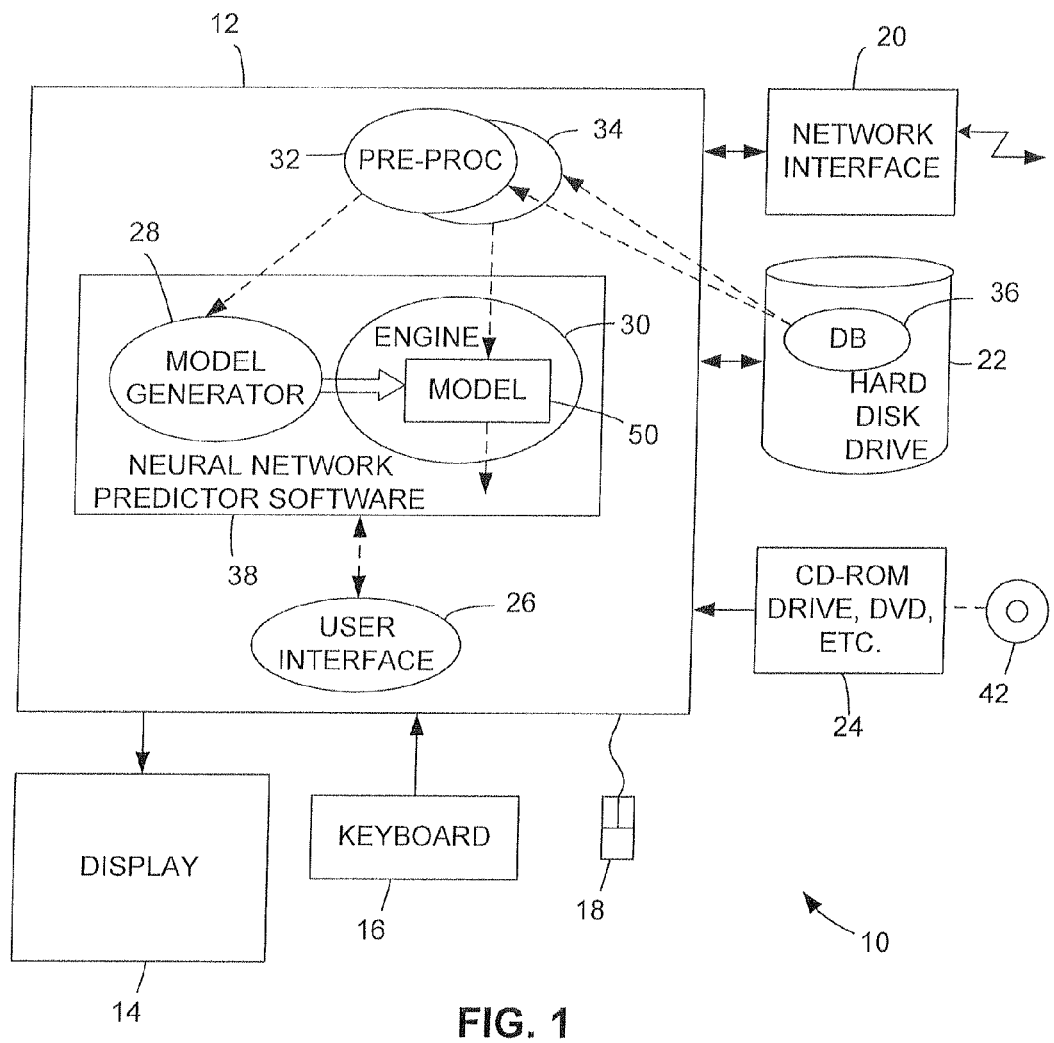
FIG. 1 is a block diagram of an exemplary computing system for determining energy cost savings using a neural network-based model.

As illustrated in FIG. 1, in an exemplary embodiment of the present invention, an exemplary computing system 10 can be used to determine energy cost savings in an energy-consuming facility. The term "facility" as used herein refers to any group of one or more commercial or residential buildings or other operations that consume energy (for example, for heating and cooling the space). Thus, the term "facility" is intended to include an individual building, a group of buildings, an individual energy-consuming system, or a group of energy-consuming systems. The invention can be used by, for example, owners or managers of the facility and related entities to assess whether energy-conserving or efficiency-enhancing measures that have been implemented are resulting in energy savings. Although in the exemplary embodiment of the invention, the system, method and computer program product are described in relation to a standalone computing system 10 for purposes of illustration, in alternative embodiments they can relate to a World Wide Web-based arrangement in which the user operates a client computer that is located remotely from a server computer. In such embodiments, the combination of client and server computers defines a computing system similar to computing system 10.

Computing system 10 can comprise a general-purpose personal computer such as a desktop, laptop or handheld computer. Such a computing system 10 includes a programmed processor system 12, a display 14, a keyboard 16, mouse 18 or similar pointing device, network interface 20, fixed-medium data storage device 22 such as a magnetic disk drive, and a removable-medium data storage device 24 such as a CD-ROM or DVD drive. Other elements commonly included in personal computers can also be included but are not shown for purposes of clarity. Although not shown individually for purposes of clarity, programmed processor system 12 includes a conventional arrangement of one or more processors, memories and other logic that together define the overall computational and data manipulation power of computing system 10.

Although in the exemplary embodiment of the invention computing system 10 comprises a personal computer or similar general-purpose computer, in other embodiments it can comprise any other suitable system. In some embodiments, portions of such a computing system can be distributed among a number of networked computers, data storage devices, network devices, and other computing system elements. It should be noted that software elements, described below, can be stored in a distributed manner and retrieved via network interface 20 from multiple sources on an as-needed basis. Similarly, they can be stored on multiple disks or other data storage media and retrieved or otherwise loaded into computing system 10 on an as-needed basis.

The methods of the invention, described below, are largely effected through the operation of programmed processor system 12 operating under control of suitable application program software. Accordingly, conceptually illustrated as stored in or otherwise residing in programmed processor system 12 are the following software elements: a user interface 26, a neural network model generator 28, a neural network model engine 30, and pre-processing elements 32 and 34. In addition, a database 36 is conceptually illustrated as residing in data storage device 22. Logical data flow among the elements is indicated in dashed line. As persons skilled in the art to which the invention relates can appreciate, these software elements are shown in this conceptual manner for purposes of illustration and may not reside in memory or other such data storage areas simultaneously or in their entireties. Rather, in the manner in which computers are known to operate, the software elements or portions thereof can be retrieved on an as-needed basis from storage devices 22 or 24 or from a remote computer or storage device (not shown) via network interface 20. Also, in other embodiments of the invention the functions of software elements 26, 28, 30, 32, 34 and 36 can be distributed over a greater number of elements or, alternatively, combined or condensed into fewer elements. Additional software elements commonly included in computing systems, such as an operating system (e.g., MICROSOFT WINDOWS), utilities, device drivers, etc., are included but not shown for purposes of clarity. In view of the descriptions herein, persons skilled in the art will readily be capable of providing suitable software and otherwise programming or configuring computing system 10 to perform the methods described herein.

Model generator 28 and engine 30 can be portions or components of a commercially available software tool 38 for predicting outcomes using a neural network model. One such software tool that has been found to be suitable is NEURAL-WORKS PREDICT, which is produced by Neuralware of Carnegie, Pa. It should be note that the invention is not limited to using any particular software, and that persons skilled in the art to which the invention relates will readily be capable of providing suitable neural network software in view of the teachings herein. As well understood in the art, a neural network is a non-linear estimation technique that replicates the function on neurons in the human brain through a collection of interconnected mathematical functions with dynamic weighting of connections enabling continuous "learning". Neural networks form these interconnected mathematical functions from the input pattern, not the input data, and apply continuously changing weights in response to the level of correlation. As a result, neural network models are able to extract the essential characteristics from numerical data as opposed to memorizing all of the data. This reduces the amount of data needed and forms an implicit model without having to form a complex physical model of the underlying phenomenon such as in the case of a building. The NEURAL-WORKS PREDICT package is specifically directed to the use of a neural network to predict outcomes for any of a wide range of problems. PREDICT can be used by software developers who have no expert knowledge of neural networks. With only minimal user involvement, PREDICT addresses the issues associated with building models from empirical data. PREDICT analyzes input data to identify appropriate transforms, partitions the input data into training and test sets, selects relevant input variables, and then constructs, trains, and optimizes a neural network tailored to the problem. As persons skilled in the art to which the invention relates will readily be capable of employing PREDICT or a similar commercially available software tool as described herein, or of otherwise providing suitable neural network software elements, neural network details will not be described herein for purposes of clarity.

In alternative embodiments, instead of (or in addition to) the neural network software tool 38 (including the model generator 28 and engine 30), the programmed processor system 12 is adapted to include a different artificial intelligence software tool. For example, the artificial intelligence software tool may include an adaptive system other than a neural network software tool. Suitable artificial intelligence software, including its design, algorithms, models, and processes, may include artificial intelligence using relational database management techniques, web-enabled data capturing, visual monitoring, statistical reporting, and remote monitoring software tools. Such artificial intelligence software's capabilities may include but are not limited to artificial, non-linear, statistical data-modeling tools, pattern matching and learning capabilities, recognizing locations of facilities, weather data, building usage, and statistical correlation. Persons of ordinary skill in the art will be able to readily select and configure such artificial intelligence software for use in projecting energy usage based on inputted actual facility condition data and based on certain energy-conserving or energy efficiency-enhancing measures having not been implemented. For illustration purposes, however, the exemplary programmed processor system 12 described herein includes the neural network software tool 38.

The user can interact with computing system 10 through user interface 26 in a conventional manner. User interface 26 can comprise, for example, a graphical user interface (GUI) that operates in accordance with standard windowing and graphical user interface protocols supported by MICROSOFT WINDOWS or similar operating system. That is, the user can manipulate (e.g., open, close, resize, minimize, etc.) windows on display 14, launch application software that executes within one or more windows, and interact with pictures, icons and graphical control structures (e.g., buttons, checkboxes, pull-down menus, etc.) on display 14 using mouse 18, keyboard 16 or other input devices. What is displayed within a window under control of an application program is generally referred to herein as a screen or screen display of the application program. User interface 26 can include not only the logic through which screen displays are generated and made viewable but also computational logic that generates and organizes, tabulates, etc., numerical values to be displayed or otherwise output. Similarly, user interface 26 can include logic for importing, exporting, opening and closing data files.

Figure 2:
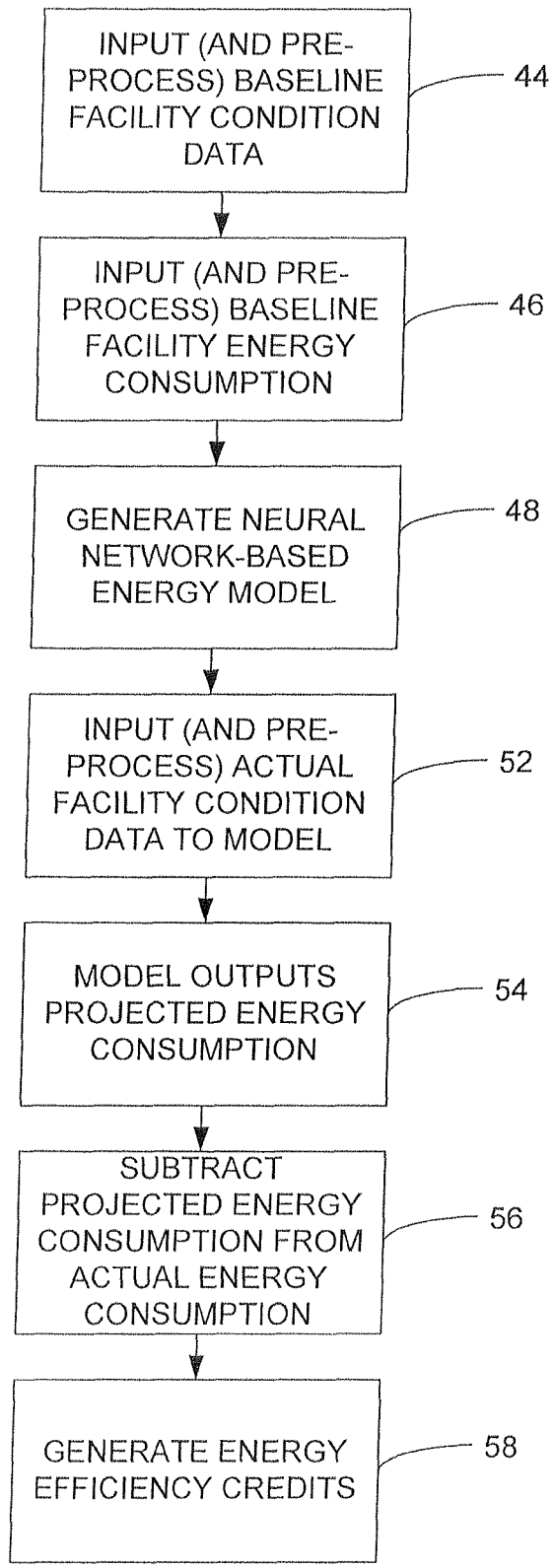
FIG. 2 is a flow diagram, illustrating an exemplary computer-implemented method for determining energy cost savings using a neural network-based model.

A method for determining energy savings in an energy-consuming facility is illustrated by the steps shown in FIG. 2. The facility can be, for example, a commercial or residential building or group of such buildings. Although for purposes of illustration with regard to the exemplary embodiment of the invention, a facility is described that is involved in manufacturing, the facility can be involved in any sort of operations in which it is desirable to conserve energy or maximize energy use efficiency. For example, essentially all facilities that purchase electricity from utility companies for purposes such as heating, cooling and illuminating the facility desire to conserve energy or maximize efficiency. As noted above, the method is primarily effected through the operation of programmed processor system 12 (FIG. 1) operating under control of an application program (software). The application program can thus comprise some or all of the software elements shown in FIG. 1 and can be provided to computing system 10 via a network 40, such as the Internet, or via one or more removable disks 42, such as CD-ROMs, DVDs, etc.). Note that the application program or other such software stored or otherwise carried on such media constitutes a "computer program product."

The method begins when the user causes the application program to begin executing. Although not specifically shown for purposes of clarity, user interface 26 can generate a screen display with a main menu of options that allows a user to navigate to any selected step, such that the method begins or continues at that step. It should be noted that the order in which the steps are shown in FIG. 2 is intended only to be exemplary, and the steps can be performed in any other suitable order. Also, additional steps can be included. Steps along the lines of those shown in FIG. 2 can be combined with other such steps to define a method having a smaller number of steps and, conversely, the steps shown in FIG. 2 can be separated into a greater number of steps. In view of the teachings herein, all such variations and combinations will occur readily to persons skilled in the art to which the invention relates. Also, preliminary steps of the types commonly performed by users of interactive software application programs, such as setting up options, customizing user preferences, etc., are not shown for purposes of clarity but can be included.

At step 44, baseline facility condition data is input. The baseline facility condition data represents facility conditions during a first time interval before the energy conservation measures whose effect is to be measured in terms of savings have been implemented. Baseline facility condition data can include weather conditions experienced by the facility during the time interval as well as occupancy data and production data. Preferably, the baseline facility condition data includes at least weather data. The user can be prompted through user interface 26 (FIG. 1) to load or otherwise select data files to input. However, as noted below, some types of data can be automatically collected and input without user interaction. Although it is contemplated that the inputting steps be performed largely by loading or downloading data files, some types of data can be input by the user manually typing in the data. In the exemplary embodiment of the invention, the facility condition data is stored in database 36 upon inputting it to computer system 10 and prior to further processing. Nevertheless, in other embodiments the input data can be received, stored and otherwise manipulated in any suitable manner.

In the exemplary embodiment of the invention, the baseline facility condition data includes historical datasets representing data gathered over a time interval of at least about 24 months and preferably no more than about 36 months. Historical weather datasets can include, for example, measurements of dry bulb temperature, wet bulb temperature, and solar radiation for each hour of the time interval. Although a user can input historical weather datasets by loading a file, alternatively, computing system 10 or an associated data gathering system that in turn provides data to computing system 10 can electronically collect (e.g., via the Internet) measurements of dry bulb temperature, wet bulb temperature, solar radiation, and other weather-related conditions for the geographic location of the facility from a weather agency such as the National Oceanic & Atmospheric Administration (NOAA). If the weather agency or data gathering system does not maintain a historical database of data gathered over the relevant time interval, computing system 10 can itself query the weather agency hourly over the relevant time interval until the data is collected.

Historical occupancy datasets can include, for example, the peak number of persons occupying the facility on each day of the time interval. In instances in which the facility comprises one or more buildings with large variations in occupancy among them, which is sometime the case in the lodging and healthcare industries, peak daily occupation can be utilized, when available.

In instances in which the facility is involved in manufacturing or other industrial operations, historical production data can also be included in the baseline facility condition data. Historical production data can include, for example, the number of product units manufactured on each day of the time interval. In instances in which the facility comprises buildings with several independent production lines, the production data can include production levels for each line. For buildings with many independent production lines, production lines are preferably aggregated into a smaller number of lines, such as about three to five lines. Occupancy and production data can be input by the user filling out spreadsheet templates, which convert the data for automated input to database 36.

In the exemplary embodiment, step 44 of inputting baseline facility condition data further comprises performing some pre-processing of that data (by means of pre-processing element 32 (FIG. 1)) before inputting it to neural network model generator 28, as described below. As part of such pre-processing, two additional weather-based statistical variables are created from the dry bulb temperature data: hours above saturation temperature per billing month and hours below saturation temperature per billing month. These two additional variables incorporate the latency effects of extreme temperatures on the heating and cooling loads of a building and the resulting energy use. Other pre-processing can include summing all hourly and daily data and converting them to average monthly values that correspond to energy billing periods so that energy savings can be correlated more readily with energy utility company billings.

The saturation temperature is the average of the maximum and minimum saturation temperatures. The maximum saturation temperature can be found by an iterative trial process of calculating the percentage of hours for each month of the time interval (e.g., 36 months) that is above the trial temperature. On the initial iteration, the trial temperature begins at the minimum hourly temperature over the time interval. As the trial temperature increases (e.g., in increments of one degree), fewer months will have 100% of their temperatures above the trial temperature. The maximum saturation temperature is found when no month has 100% of the hours above the trial temperature. Conversely, the minimum saturation temperature is found by an iterative trial process of calculating the percentage of hours for each month of the time interval (e.g., 36 months) that is below the trial temperature. On the first iteration, the trial temperature begins at the maximum hourly temperature over the time interval. As the trial temperature decreases in increments of one-degree, fewer months will have 100% of their temperatures below the trial temperature. The minimum saturation temperature is found when no month has 100% of the hours below the trial temperature.

Figure 3:
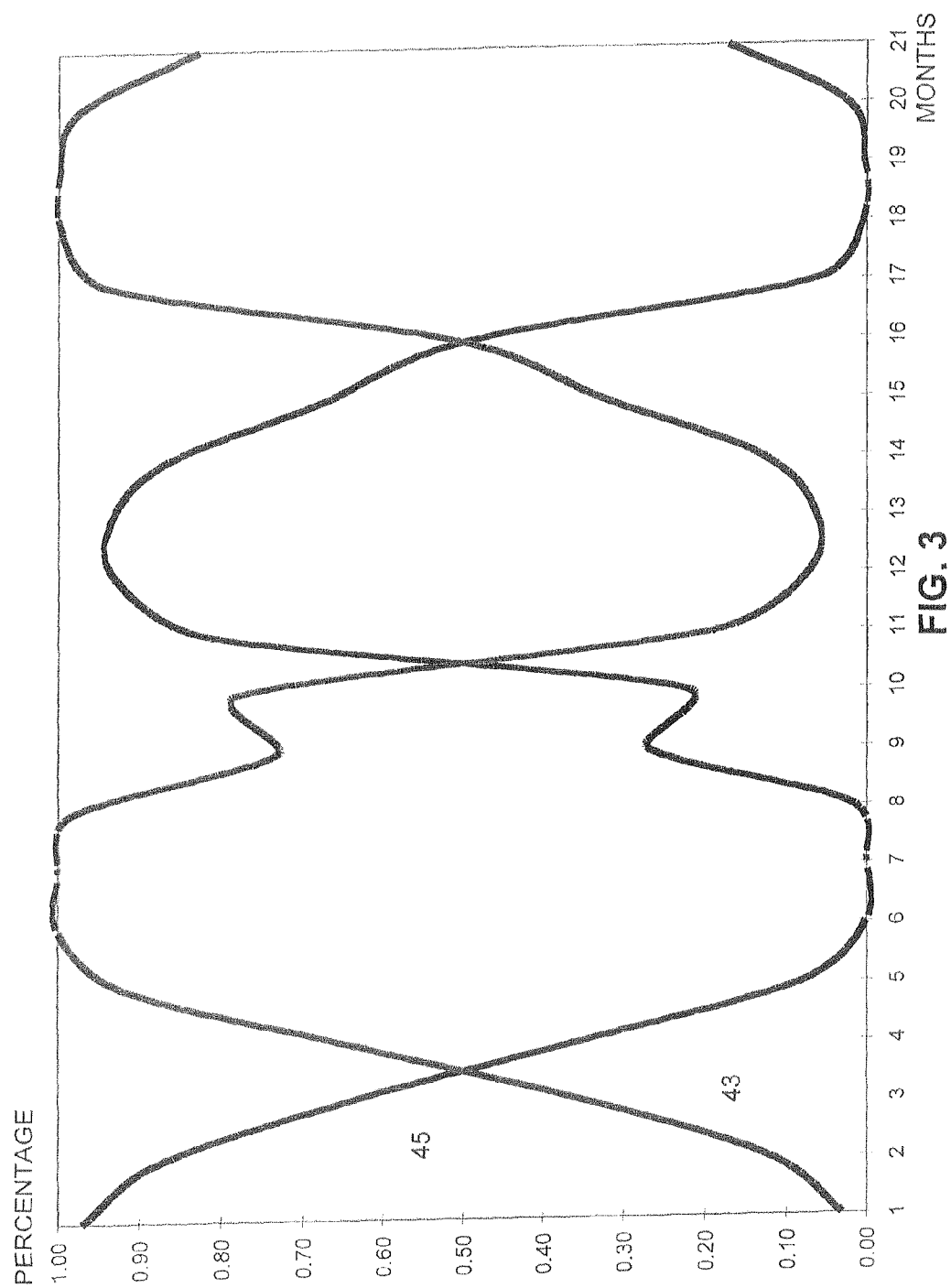
FIG. 3 illustrates exemplary sinusoidal functions representing percentage of hours above and percentage of hours below the saturation temperature.

As illustrated in FIG. 3, the above-described iterative process generates two sinusoidal functions 43 and 45, representing percentage of hours above and percentage of hours below the saturation temperature, respectively, in each billing month, varying from 0% to 100% (0 to 1), i.e., percentage of hours of extreme temperatures. From the illustration, it can be seen that the saturation temperature ensures a very useful representation of the data by preventing the saturation of the curves with multiple points above 100% creating a flat peak and loss of data.

At step 46, baseline energy consumed by the facility during the time interval is input. As with other data inputting steps, the user can be prompted through user interface 26 (FIG. 1) to load or otherwise select data files to input. As described above with regard to other data inputting steps, although a user can input historical energy datasets by loading a file, alternatively, computing system 10 or an associated data gathering system that in turn provides data to computing system 10 can electronically collect energy billing information over the time interval (e.g., using Electronic Data Interchange (EDI) protocols via network 40 (FIG. 1)). In the event that such a method is not available, the user can manually enter energy data into a spreadsheet template, which converts the data for automated input to database 36. Although in the exemplary embodiment of the invention, the energy consumption data is stored in database 36 prior to further processing, in other embodiments the input data can be received, stored and otherwise manipulated in any suitable manner. For any weather and energy data that computing system 10 can obtain automatically from a remote source via network 40, it automatically updates database 36 with new weather and energy data on a periodic (e.g., monthly) basis to maintain the baseline data in a current state.

Step 46 can further include performing some pre-processing on the energy data (e.g., by means of pre-processing element 32 (FIG. 1)) before inputting it to neural network model generator 28, as described below. As part of such pre-processing, the data can be converted, if not already in such a form, to monthly energy consumption values corresponding to utility company billing periods. Monthly energy billing data will usually require conversion because they are typically based on the energy supplier's (e.g., utility company's) reading of the applicable meter at the facility, not the calendar month. Moreover, the number of days for each billing month and the starting day for each billing month can vary by several days.

As billing months have different numbers of days, energy data should generally be converted (i.e., normalized) from monthly totals to daily averages, such as electricity in terms of kWh/day, and natural gas in terms of Btu/day. Generally, the energy variables, principally electricity and natural gas, are modeled separately for the same building. However, the energy use can be aggregated for a single energy use model using either Btu or kWh. A summary of the baseline data that forms the input data for neural network model generator 28 is shown in FIG. 4. Note that, with regard to the use of a neural network algorithm, energy use can be considered a dependent variable, and weather or other facility conditions can be considered independent variables.

Figure 6A:
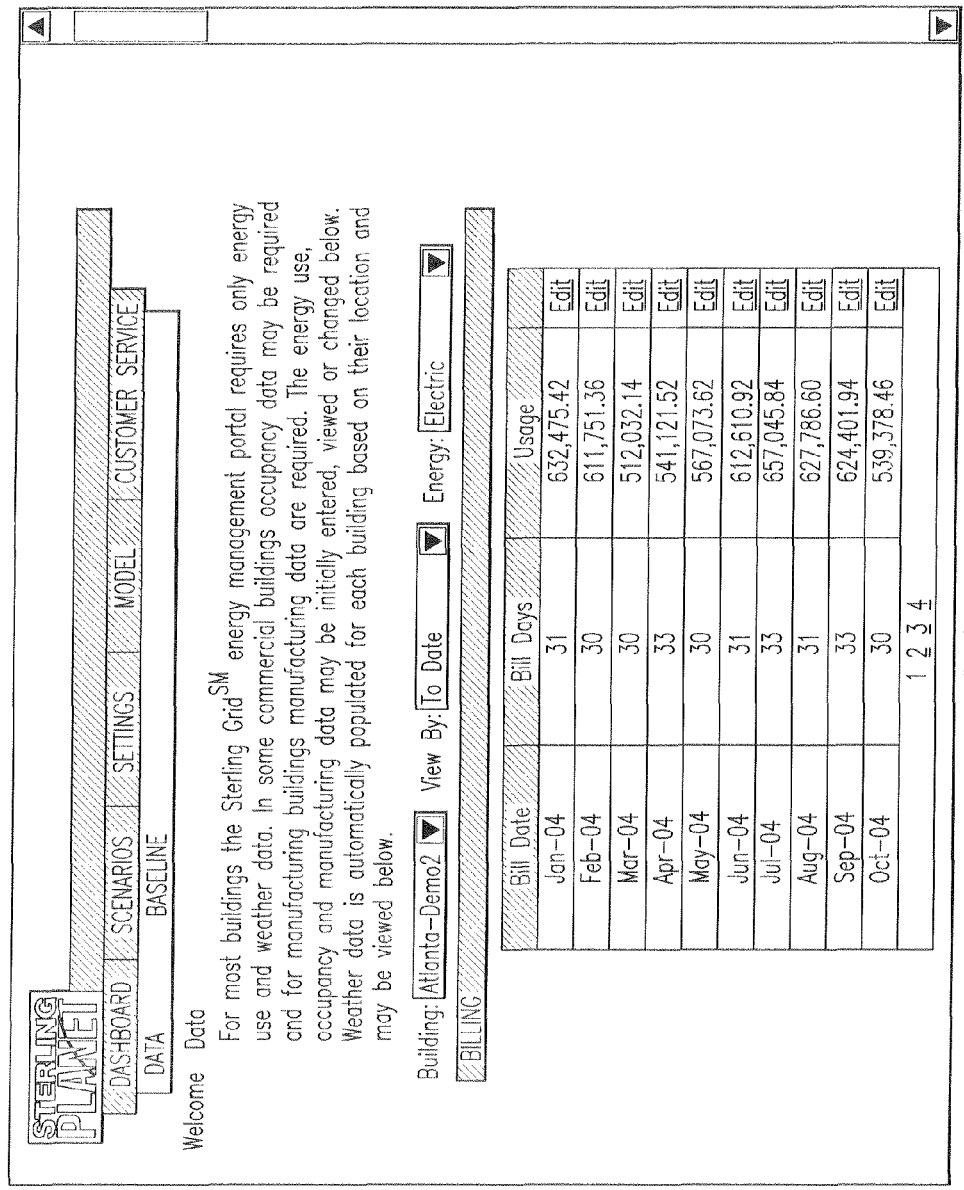
FIG. 6 depicts an exemplary screen display of baseline facility condition data and baseline energy data.

The exemplary screen display shown in FIG. 6 illustrates the manner in which the baseline facility condition data and baseline energy data can be displayed after they have been input and loaded into database 36 (FIG. 1). For purposes of usability, the humidity values shown in FIG. 6 are calculated by the system and displayed instead of wet bulb temperature.

Figure 9:
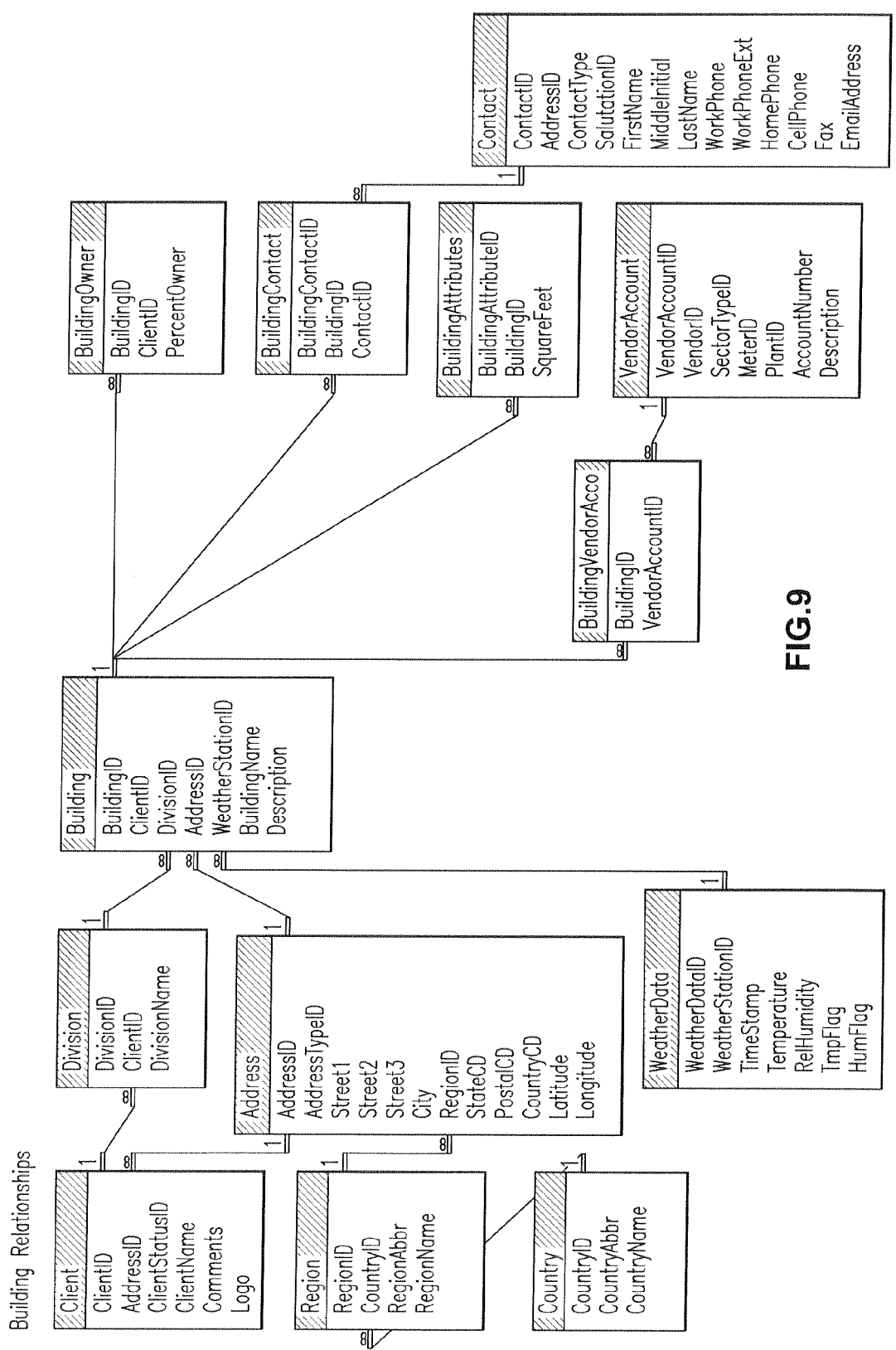
FIG. 9 is an exemplary facility relationships diagram.
Figure 10:
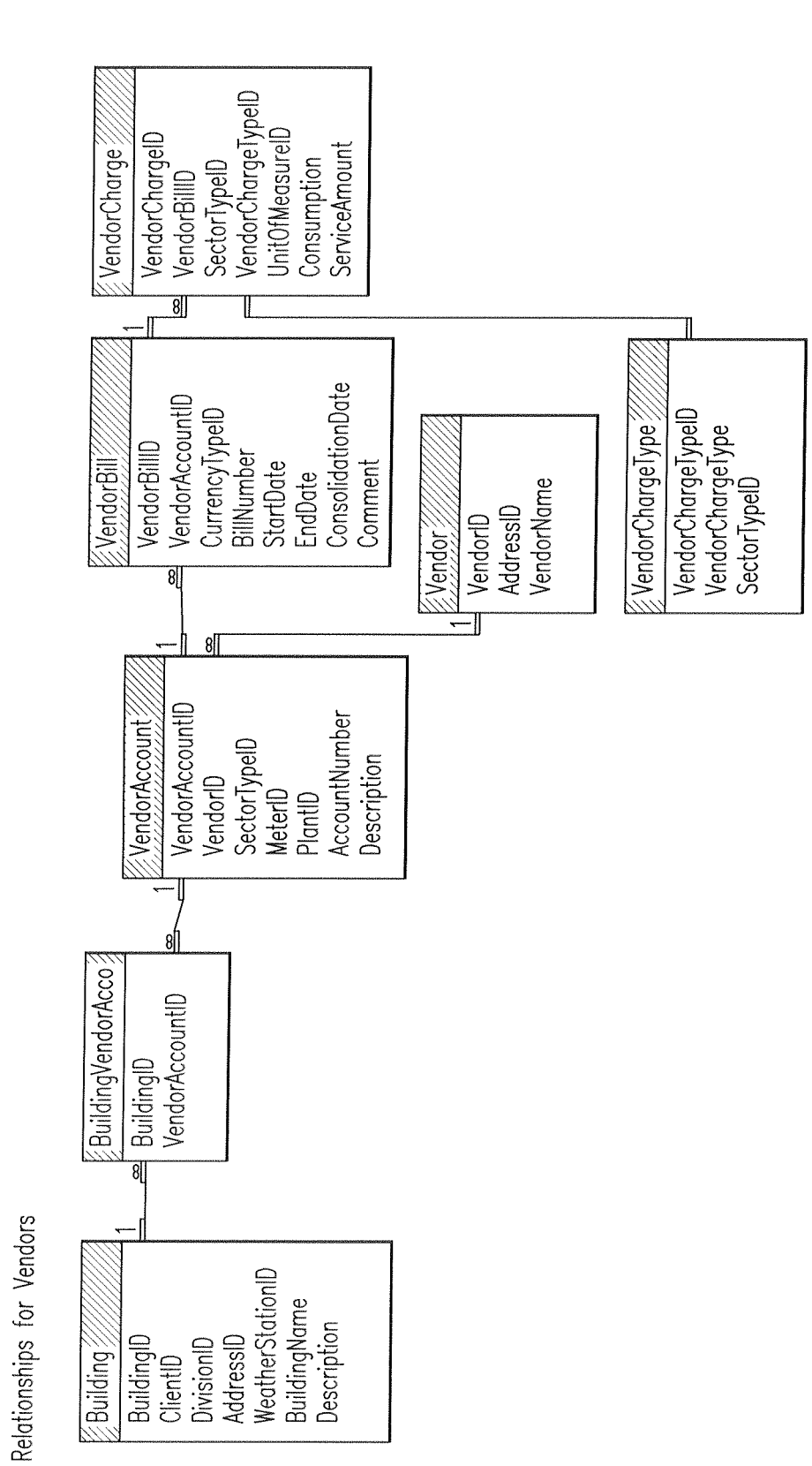
FIG. 10 is an exemplary vendor relationships diagram.
Figure 11:
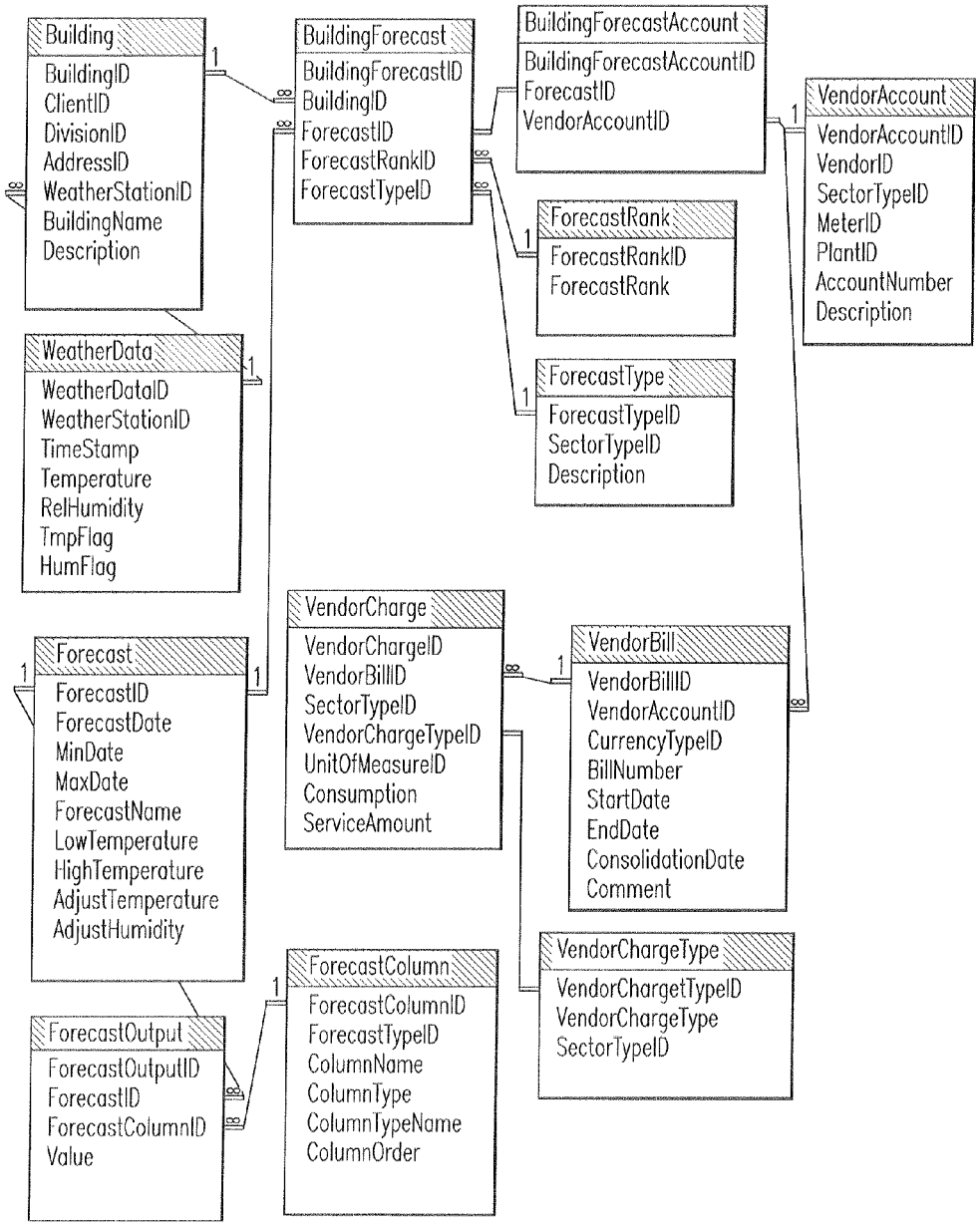
FIG. 11 is an exemplary forecast relationships diagram.

Database 36 can be a standard relational database defined by tables and the data relationships. An exemplary table structure of database 36 is shown in FIGS. 7-8 with descriptive textual labels indicating the table contents. A facility relationships diagram, illustrated in FIG. 9, represents how buildings or other facility units are related to clients, corporate divisions, addresses, owners (potentially shared facilities), contacts, vendor accounts (energy supply), and other entities. Also, a vendor relationships diagram, illustrated in FIG. 10, represents how buildings or other facility units are related to vendors (i.e., energy suppliers such as utility companies) and the bills that the facility receives, as well as the types of charges seen on each bill (consumption—or energy used, base charges—or monthly delivery charges, monthly adjustments, etc.). In addition, a forecast relationships diagram, illustrated in FIG. 11, shows how buildings or other facility units and their corresponding input data (i.e., vendor bills, and weather data) are related to the facility's baseline energy use output.

At step 48, model generator 28 generates a neural network-based model 50 (FIG. 1) in response to the baseline energy consumption data and baseline facility condition data. Model 50 represents a facility's baseline energy use. As described below, model 50 can be used as a tool for projecting or estimating the amount of energy that would have been consumed by the facility but for the implementation of the energy efficiency or conservation measures in question.

In order to generate model 50, parameters for the neural network algorithm must be defined that are appropriate for the application. These parameters include the data variability or noise level, data transformation scope, variable selection scope, and network selection scope. The last three parameters refer to the scope or the range of options the algorithm evaluates in finding the best distributions of data, data subsets of variables and network types such as Multi-Layer Perception (MLP) and Generalized Regression (GR). Persons skilled in the art to which the invention relates will readily be capable of defining suitable parameters for neural network tool 38 or other such neural network element. Commercially available neural network prediction software, such as NEURALWORKS PREDICT, typically automates or assists with parameter selection and other such setup tasks. A summary of suitable neural network parameters and their selections for execution of model 50 to determine a building's baseline energy use is shown in FIG. 5.

A table of exemplary baseline facility condition data and baseline energy consumption data to be input to model generator 28 is shown in FIG. 12. Also, although not illustrated for purposes of clarity, prior to execution, the model parameters generally must be defined in terms of data variability, data transformations, variable subsets, and network types for input to the neural network-based model 70.

In response to the baseline energy consumption data and baseline facility condition data (and further based upon the selected model parameters, as described above with regard to FIG. 5), model generator 28 produces model 50. Model 50 represents a baseline energy use model for the building or other facility unit that can produce monthly forecasts or projections over a time interval. A table of exemplary output data produced by model 50 in response to the baseline energy consumption data and baseline facility condition data (and for the time interval to which this baseline data corresponds) is illustrated in FIG. 13. Such baseline monthly forecasts or predictions enable a measure of the accuracy of model 50. An average monthly error and a weighted total error can be calculated to ensure that the forecast produced by model 50 is within acceptable error tolerances. For example, a weighted total error of less than 2% may be considered acceptable. If the error rates from the historical baseline energy consumption data and facility condition data are acceptable, model 50 is sufficiently accurate to be used to predict or estimate energy savings after an energy-conserving or energy efficiency-enhancing measure is implemented.

At step 52, actual facility condition data is input. The actual facility condition data represents facility conditions during a second time interval, after the energy-conserving or energy efficiency-enhancing measures have been implemented. The actual facility condition data can include weather conditions experienced by the facility during the time interval as well as, in some embodiments of the invention, occupancy data and production data, as described above with regard to the baseline facility condition data. The actual facility condition data can be input in the same manner as described above with regard to the baseline facility condition data.

Step 52 can further include performing pre-processing on the data (by means of pre-processing element 34 (FIG. 1)), similar to the pre-processing described above.

At step 54, model 50, in response to the actual facility condition data, produces a prediction or estimate of the amount of energy that the facility would have consumed had the energy-conserving or energy efficiency-enhancing measures not been implemented. The prediction comprises monthly values for each month in the second time interval.

At step 56, the predicted or estimated energy consumption is subtracted from the actual energy consumption for each month in the second time interval. The difference represents the estimated energy savings that resulted from implementing the energy-conserving or energy efficiency-enhancing measures.

Figure 14:
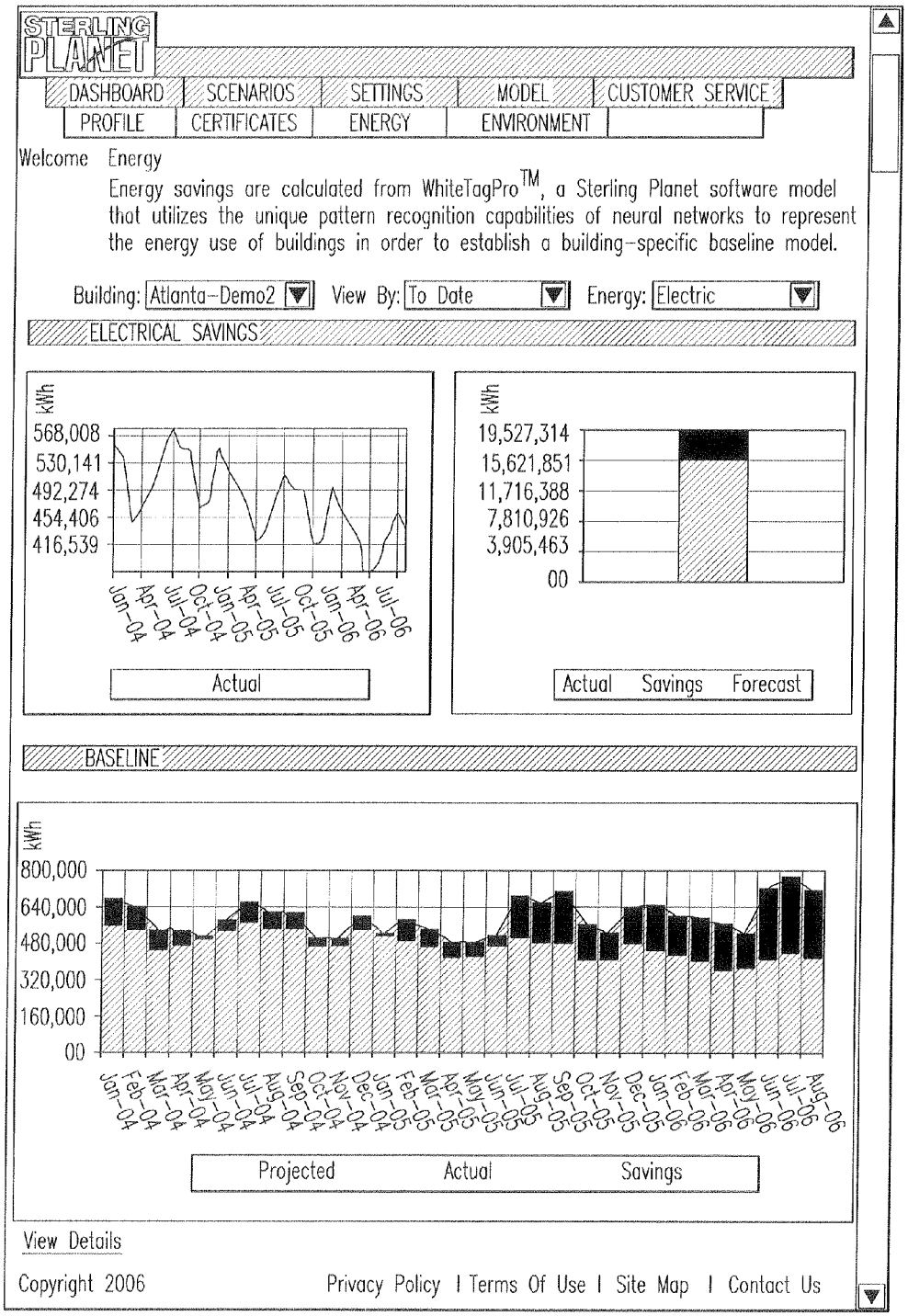
FIG. 14 depicts an exemplary screen display of baseline energy consumption, actual energy consumption, and projected electrical energy savings.

After each subsequent billing month from the date the energy efficiency or conservation measure is implemented, the system can automatically re-perform some or all of the above-described steps, especially steps 46 and 48, so as to maintain a current baseline. The predicted or estimated energy consumption for the current month can be compared with the actual energy consumption for the current month. An exemplary screen display, illustrated in FIG. 14, depicts baseline energy consumption, actual energy consumption, and projected electrical energy savings for a time interval in graphical and tabular form. Projected electrical energy savings is output in a pop-up window (not shown) in response to the user selecting "View Detail."

Given that these energy savings calculations are accurate and scalable as well as low-cost in application to large numbers of buildings, new tradable attributes derived from implementing energy efficiency and conservation projects may be effectively created and certified in accordance with regulatory agencies. For example, several U.S. states have passed legislation establishing such tradable attributes, often referred to Energy Efficiency Certificate (EECs). These states have mandates for achieving a percentage of their energy supply from efficiency and conservation similar to mandates requiring a percentage energy supply be from renewable energy as part of the state's Renewable Portfolio Standard (RPS).

At step 58, EECs corresponding to the computed energy savings can be generated, displayed and stored. In a manner analogous to that in which a renewable energy credit (REC) represents proof that one MegaWatt hour (MWh) of electricity has been generated from a renewable-fueled source, an EEC generated in accordance with the present invention can represent proof that, for example, one megawatt hour (MWh) of energy has been saved as a result of implementing an energy-conserving or efficiency-enhancing measure. EECs are denominated in MWhs and are equal to the energy savings, thus requiring no conversions or calculations. The avoidance of air emissions associated with the energy savings and the EECs are calculated by using the United States Environmental Protection Agency (EPA) conversion factors that are location specific. Based on the building's address, the system locates in the database the appropriate conversion factors for $SO_2$, NOx and $CO_2$. Database 36 can maintain the most current EPA e-Grid data on the conversion factors. To generate an EEC, the computed energy savings value and any related data that will be required by the certifying agency can be stored in database 36 or other data storage area in a format suitable for transfer to the certifying agency via either a paper form or electronic means.

Figure 15:
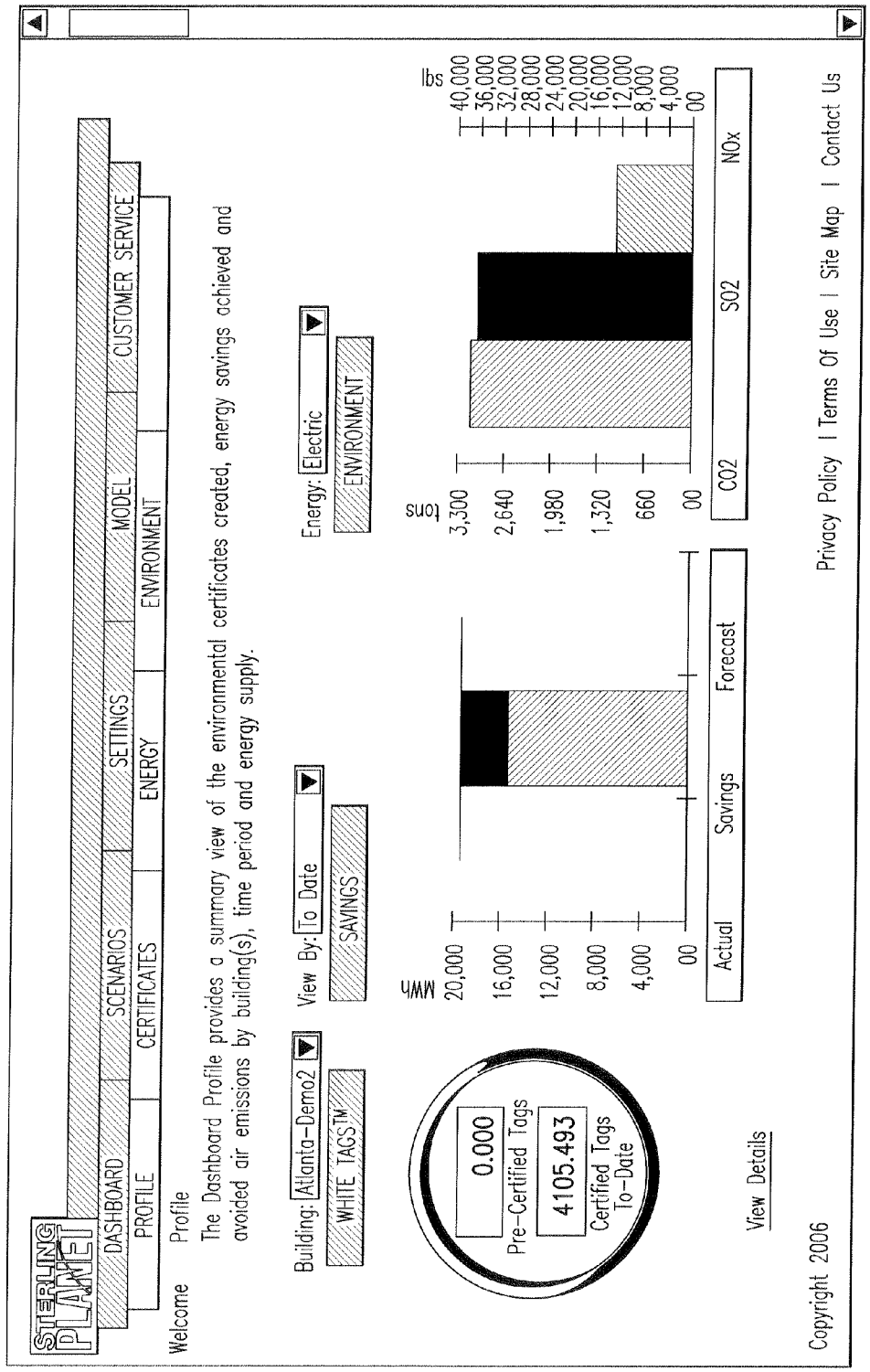
FIG. 15 depicts an exemplary screen display of a "dashboard" or summary page, showing energy savings and related information.

A screen shot of a "dashboard" or summary page, illustrated in FIG. 15, summarizes the energy savings, EECs created, and the avoided emissions. The system makes a distinction between EECs that have been certified for sale and those tags yet to be certified. Typically, government regulatory agencies perform certification quarterly. Once certified, EECs can be traded on the market. (In FIG. 15, the EECs are referred to as "WHITE TAGS," a Sterling Planet, Inc. brand name.)

Given that a user may have hundreds to thousands of buildings, the system is designed to be as completely automated as possible and serve primarily as a monitoring and reporting tool employing a highly advanced analytical engine. The complexities and operation of model 50 are mostly hidden from the user. However, the user may execute model 50 to evaluate various scenarios to determine the impact on the energy savings, EECs, and avoidance of air emissions. Scenarios may be either a change in location of the building or a change in the temperature (dry bulb). In the case of the former, the user can specify a different location for the building and execute the model to see how the building would perform in terms of energy usage in different climates. Similarly, the user may add or subtracts degrees of temperature to the average monthly temperatures (dry bulb). Scenarios apply to the created baseline energy use model and thus effect only the time period after the energy efficiency or conservation measure became operational.

In other exemplary embodiments of the present invention, there are provided new computer-based systems, computer-implemented methods, and computer program products that provide for additional pre-processing and post-processing of data. In one such exemplary embodiment, additional pre-processing generates a larger, more sufficient amount of energy-consumption data for training the neural network model from a smaller, less sufficient amount of energy-consumption data. Neural networks rely on training to enable them to make accurate projections based on input data. The training process exposes the neural network to a variety of inputs and corresponding outputs. The wideness of the variety determines the range over which the neural network can respond with predictable accuracy. The amount and variety of training data determines whether the neural network will tend to memorize (simple over-fitting), as opposed to generalize (learning). The more data available, and the wider the variety of that data, the more testing and verification can be done to avoid over-fitting.

The data-expansion pre-processing can be performed at step 46 (FIG. 2), for example by means of pre-processing element 32 (FIG. 1), before inputting the energy-consumption data to the neural network model generator 28. The data-expansion pre-processing includes combining inputted individual energy-consumption datums for individual time periods into a greater number of energy-consumption datums. For example, a first utility bill could list the energy consumed by the facility over a 28-day period and a second utility bill could list the energy consumed by the facility over a 31-day period that immediately follows the first period. These utility bills provide two individual raw datums—energy used in period one and energy used in period two. The data-expansion process includes generating a third combined datum based on the first two individual raw datums. The third combined datum is the total energy consumed by the facility in the combined first and second time periods. Thus, the total energy consumed is the energy used in period one plus the energy used in period two. And the combined time period is the amount of time (e.g., the number of days) in period one plus the amount of time in period two—in this case, 59 days.

Utility bill time periods are typically sequential, so the data-expansion pre-processing can be set up to generate the third combined datum by using the start date of the first period and end date of the second period to get the combined time period. But in that case only sequential time period datums could be used in the process. So the data-expansion pre-processing may additionally include the step of first matching up start and end dates of the individual raw energy-consumption datums to make sure that the time periods are sequential before combining them this way.

In the example just described, the data-expansion pre-process was illustrated for two raw datums. The same process can be expanded for use with any number N of individual raw datums to generate $\frac{1}{2}(N^2+N)$ total (raw plus combined) datums. Each raw datum is combined with each other raw datum, individually and collectively in every unique combination available, to generate the combined datums. For example, FIG. 16 shows how the data-expansion pre-process expands four individual raw datums (left column) into ten total datums (right column, including the raw datums and the combined datums). As the figure shows, the data-expansion pre-process generates six combined datums (datums 2, 3, 4, 6, 7, and 9) for inputting, in addition to the four raw datums (datums 1, 5, 8, and 10), to the neural network model generator 28. Similarly, the data-expansion pre-process will expand three individual raw datums into six total (raw and combined) datums, five individual raw datums into fifteen total datums, and so forth.

Accordingly, this data-expansion pre-processing enables the neural network to be better trained with only a relatively few raw datums. In particular, the pre-processing generates a larger amount and greater variety of energy-consumption datums for better training the neural network model. The variety is increased because the time periods of the combined datums are longer than those for the raw datums. With this larger number and wider variety of energy-consumption datums being inputted, the neural network model tends to "learn" rather than merely over-fit when exposed to the datums.

In addition, when performing this data-expansion pre-processing, the raw energy-consumption datums need not be normalized (e.g., converted to represent average daily energy consumption). The neural network accounts for the differing time periods of the energy-consumption datums, without actually normalizing them. With day-normalized datums, the significance of any erroneous data present can be amplified. This can be because for example there is typically some post-processing to expand the projected energy savings out to a longer period (de-normalizing), thereby magnifying the error. Also, day-normalizing can reduce the accuracy of the datums. This can be because for example one time period might include more weekends (when some facilities consume less energy because they are not open or not fully staffed/operational) than another. By not day-normalizing the raw energy-consumption datums, there is no (or at least less) subsequent de-normalizing, so outlier datums are less significant. Also, by not day-normalizing, the datums used to train the neural network tend to more accurately reflect the causal relationships between actual facility conditions and actual energy consumption. Moreover, by not day-normalizing the raw energy-consumption datums, workdays per period can be integrated into the neural network, whereas when day-normalized this data is not integratable. In some alternative embodiments, however, the data-expansion pre-processing includes time-normalizing the raw energy-consumption datums (e.g., to a daily basis).

It should be noted that the data-expansion pre-processing need not expand the raw datums into exactly ½ ($N^2+N$) total datums. For example, the pre-processing can be set up so that only the largest possible time periods are used in new combined datums. In the example of FIG. 16, this would result in the right column only having the raw and combined datums 1, 4, 5, 7, 8, 9, and 10. Persons of ordinary skill in the art will understand that the data-expansion pre-processing can be set up to expand N raw datums to any number of total datums from N+1 to ½ ($N^2+N$).

Another exemplary embodiment includes post-processing that permits energy savings to be recognized from additional energy-conserving or energy-efficient measures and at the same time more accurately generates EECs even when facility energy use creeps upward. Typically, a building's energy performance profile is modeled once, before an energy-conserving or energy-efficient measure is implemented (i.e., for the first time interval). As described above, the EECs are determined based on the difference between actual post-measure energy consumption (i.e., in the second time interval), as reported by utility bills, and the projected energy use had the measure not been implemented and given the same facility condition data (i.e., weather, occupancy, units manufactured, etc.) in the second time interval. But this is only accurate if the facility condition data actually stays the same throughout the second time interval, which is not usually the case. Typically, the facility condition data, and thus the actual energy used, is dynamic and changes due to the increased load resulting from expanded operations. Such expanded operations might include, for example, the facility being used more intensely, more equipment being installed, and/or the facility being enlarged. In addition, the actual energy used will tend to creep upward due to small incremental changes in the facility condition data such as hiring a new staff person, adding another copying machine, etc. Because of all this, in many cases the facility's actual energy consumption will tend to increase over time. This energy usage creep is illustrated graphically in FIG. 17. As the facility expands operations, the actual post-measure energy consumption in the second time interval (t2), as reported by utility bills, also increases. So the difference between the projected energy consumption—which is based on the outdated facility condition data for the second time interval—and the actual energy consumption, as determined in step 56, is reduced. Accordingly, the EECs generated would be reduced by a corresponding amount. Eventually there is a crossover point after which no EECs are earned, even though the energy saving measure has in fact saved energy. If a subsequent energy-saving measure is implemented, the actual energy usage will decrease, and thereafter in a third time period (t3) EECs may again be earned. But the EECs will not accurately reflect the true energy savings.

Generally described, the post-processing includes repeating the method of FIG. 2 to generate an updated neural network-based model of the facility based on updated facility condition data, and generating updated EECs using the updated model. This post-processing is done after the method of FIG. 2 has been completed (at least after step 54 has been completed), but before any additional energy-conserving or energy-efficient measures are implemented. Thus, the post-processing can be done as soon as sufficient new actual energy consumption data for the second time interval is available (i.e., after a few utility bills have been received). Automatic meter reading and other conventional methods and devices can be used to get more actual energy use data in a shorter period of time. Alternatively, the post-processing can be deferred and done later, just before a subsequent energy saving measure is implemented. In this way, more actual energy use data is available for inputting and training the neural network model.

More particularly, the post-processing includes repeating the method of FIG. 2 using updated facility condition data. Thus, at step 44 the updated facility condition data for the second time interval is inputted. This is based on the facility as it stands and is used in the second time interval after the initial energy-saving measure has been implemented but before the subsequent energy-saving measure is implemented. Then at step 46 the updated actual energy consumption for the second time interval is inputted. This is taken from the utility bills in the second time interval after the initial energy-saving measure has been implemented but before the subsequent energy-saving measure is implemented. Next, at step 48 the updated energy usage model for the facility is generated based on these inputs. After that, at step 52 the updated facility condition data for the third time interval is inputted to the model. This is based on the facility as it stands and is used in the third time interval after the subsequent energy-saving measure has been implemented. At step 54 the model outputs the projected energy consumption (but for the subsequent energy saving measure that has been implemented) for the third time interval. At step 56, this is subtracted from the updated actual energy consumption for the third time interval, which is taken from the utility bills in the third time interval after the subsequent energy-saving measure has been implemented. And at step 58 the EECs are generated based on the projected energy savings determined by step 56.

In this way, the updated facility condition data, which more accurately represents the expanded operations of the facility, results in a more-accurate, updated energy usage model being generated. In turn, the updated energy usage model outputs a more-accurate and increased (typically, but not necessarily) projected energy consumption (but for the subsequent energy saving measure that has been implemented) for the third time interval. So the projected energy savings determined at step 56 are more accurate and not compressed by the outdated energy usage model. This increased projected energy consumption is illustrated graphically in FIG. 18. As can be seen from the figure, in the third time period (t3) after the subsequent energy-saving measure has been implemented the projected energy savings are not compressed due to expanded operations and usage creep. Accordingly, the corresponding EECs are not lessened in the third time period, so the facility gets the EECs it has earned. This allows the facility to continue to expand operations while continuing to earn EECs from prior efficiency measures without being impacted by new equipment installations.

In the example depicted in FIG. 18, the post-processing is performed just before the subsequent energy-saving measure is implemented, at the end of the second time period (t2). For more accurately generated EECs before this time, the post-processing could be performed after each time of expanded operations, or it could be performed routinely as a regularly scheduled action (e.g., monthly, quarterly, etc.).

As an example, a facility might implement two measures of expanded operations, first upgrading its lighting system and subsequently retrofitting a chiller. If the EECs are being determined based on an energy use model generated based on facility condition data including the lighting system upgrade, but not the chiller retrofit, then the facility is being short-changed on EECs. By performing the model-updating post-process, the EECs will be determined based on an updated energy use model generated based on updated facility condition data including the lighting system upgrade and the chiller retrofit. So the EECs awarded will more accurately reflect the true energy savings.

In addition, this model-updating post-process may be used to provide a baseline against which the improved facility is graded on an ongoing basis as to how well its own conservation and operation and maintenance (O&M) measures are going. That is, the facility managers can compare the updated energy usage projection for the second time interval (from repeated step 54) to the actual energy consumption in the second time interval (from original step 56) to see if the numbers match-up reasonably well. This could be useful to help determine if the facility is operating as expected or better than it has historically.

Furthermore, performing this post-processing eliminates the possibility of over-crediting EECs. For example, if after some time the facility managers shut down a production line or shift, then the actual energy consumption would decrease. This results in a change to the facility condition data. Without the model-updating post-process to reflect this change in the model, it will appear that the facility is saving more energy that is really is, and the facility could be awarded increased EECs that it has not earned. By performing the model-updating post-process, the energy use model is updated with the updated facility condition data, so the energy savings and corresponding EECs are more accurately determined on an on-going basis.

In other exemplary embodiments of the present invention, there are provided new computer-based systems, computer-implemented methods, and computer program products that provide for determining energy savings for an individual or group of individual energy-consuming systems within a facility or group of facilities. (For the purposes of describing this embodiment only, the term "facility" is intended to mean only an individual building or a group of buildings, and not an individual energy-consuming system or a group of energy-consuming systems.) The previously described embodiments provide for determining energy savings for an entire facility or group of facilities. But sometimes, instead of relying on high-level facility energy usage and savings data, is it desirable to be able to use system-specific energy usage and savings data.

There are at least two reasons for this. First, a facility-based model is more of conservation measure than a system efficiency measure. Energy efficiency may, at its most basic level, deal with the efficiency of a single system, be it lighting, refrigeration, or cooling, etc. Given more-efficient equipment, the facility may end up adding more equipment. This raises the energy usage overall, but nevertheless increases the efficiency. The whole system is more taxed than before, which is the opposite of the intended effort, or at least counterproductive, if the intent is to just retard energy use growth as opposed to stopping it. Conservation, on the other hand, would likely look to stop energy use growth, or perhaps reduce usage overall. The facility-based model rewards facilities as long as their total usage is below the baseline projected usage, but does not reward them if they use the energy savings from installing more-efficient equipment to justify installing more actual equipment. Second, in some situations it may be desirable to reward the efficiency of a specific system by itself, as opposed to rewarding only overall energy conservation.

Generally described, the computer-based systems, computer-implemented methods, and computer program products of this embodiment are similar to those of the above-described embodiments, except that they are adapted for modeling energy use and determining energy savings for only one or a group of individual energy-consuming systems. This system-based modeling and EEC-determining process provides a lower-level granularity for individual systems relative to the facility-based approach of the other embodiments. This works especially well for modeling for computer server systems that are being consolidated.

Figure 19:
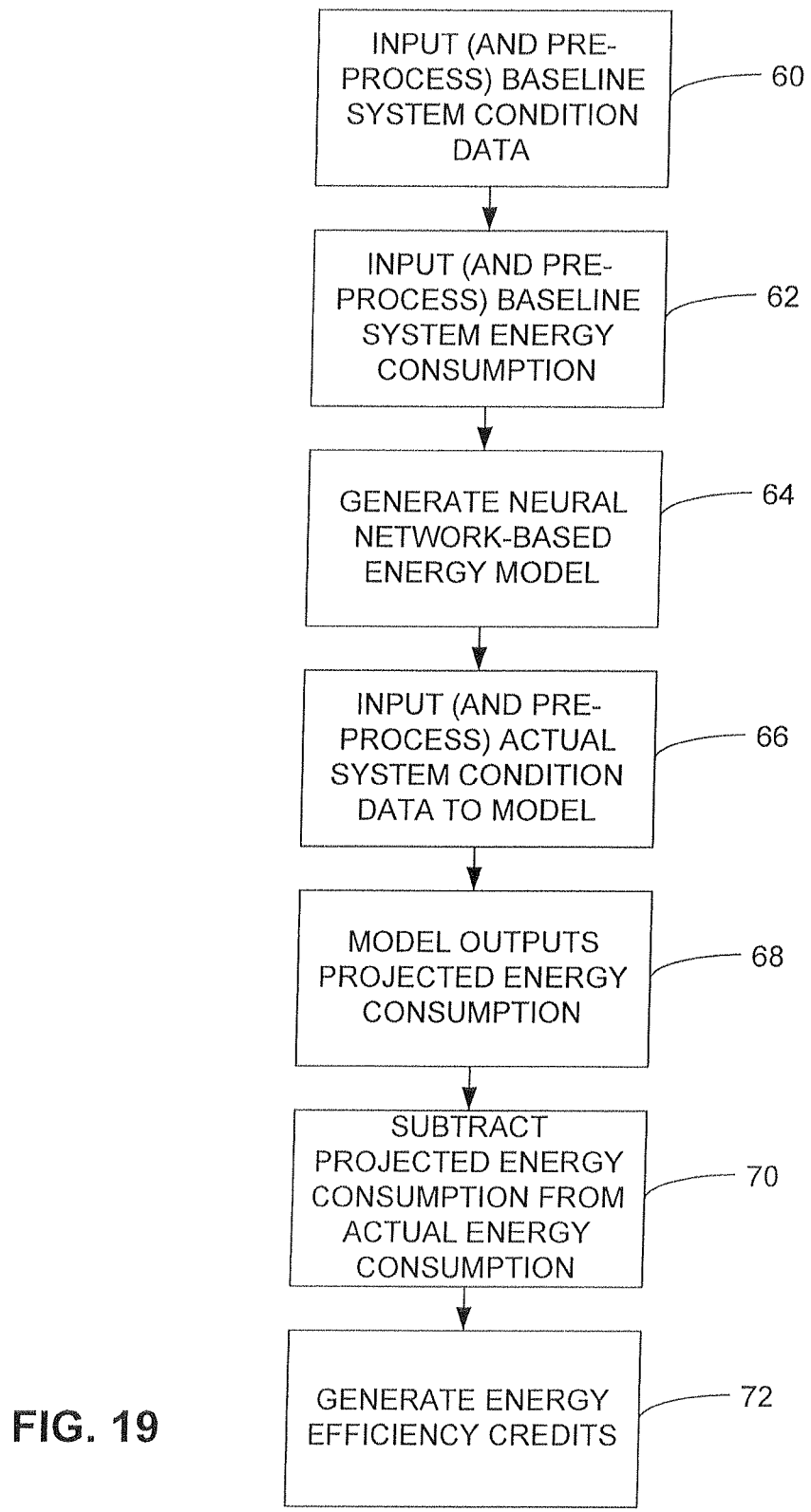
FIG. 19 is a flow diagram, illustrating an exemplary computer-implemented method for determining energy cost savings of an individual energy-consuming system using a neural network-based model.

In particular, this system-based modeling and EEC-determining process includes the following steps, which are illustrated in FIG. 19. First, at step 60 baseline system condition data is generated and input to the neural network generator. The system condition data does not include weather data, occupancy, or other most other of the factors included in the facility condition data. Rather, the system condition data includes the amount of time the system (or each system within the group) is operated in a given time period. This can be based on the average load level of the system during that period. Or this can be broken down into the amount of time the system is operated at each of several load levels (e.g., 25%, 50%, 75%, and 100% of capacity) during that period. Pre-processing of the data can be done, for example, to time-normalize it.

At step 62 energy consumption data is determined and input to the neural network generator. The energy consumption data is collected while subjecting the energy-using system (or group of systems) to measurable loads. In the case of computer systems, the primary loads are the CPU, disk system, RAM system, network bandwidth, and fan speed. The CPU is the largest load. The fan is likely directly related to the other variables and so typically it can be ignored. This can be done over a short period of time by artificially operating the system at different load levels and measuring the energy consumption at each load level. The load levels can be selected to correspond to the loadings used in step 60. The system energy consumption at each load level can be measured by individually metering the system (i.e., the system is metered separately from the overall facility). Pre-processing of the data can be done, for example, to time-normalize it.

If desired, this step can include factoring in the indirect energy usage for the system. For example, when the computer system is running it generates heat, and the cooling system then has to use energy to remove that amount of heat from the building. So the computer system itself may run at 50 W, but the cooling system might need to run at an additional 25 W to cool the computer system. For accuracy, this indirect energy usage by the cooling system can be added to and included in the system energy consumption data. This can be done by measuring or collecting the efficiency ratings of the indirect energy using equipment, for example, the Coefficient of Performance (COP), SEER, or EER of the cooling equipment. In alternative embodiments, for convenience this step is not included in the method, but in that case the energy savings determined by the method will not be as accurate.

At step 64, a neural network model is generated based on these inputs. At that point, an energy-saving measure can be implemented. Continuing with the computer system example, the computer servers can now be consolidated through virtualization.

At step 66, the updated system condition data for the virtualized machine is determined and input to the neural network model. At step 68 the model outputs a projected energy usage "but for" the server consolidation, at step 70 this projection is subtracted from the actual energy used by the virtualized machine after the consolidation, and at step 72 EECs are generated based on the projected energy savings. The updated system condition data is determined similarly to what was done at step 60 except it would be based on the virtualized machine. The actual energy used by the virtualized machine after the consolidation can be readily determined by individually metering the system.

In many ways this system-based modeling process is similar to modeling an entire facility. One difference is that indirect energy usage is no longer part of the whole, but must be estimated individually. A positive to this approach is that individual systems may be aggregated virtually onto a single machine or group of machines at a single location.

There are several potential problems with a facility-based approach that are addressed by the system-based modeling and EEC-determining process. First, the energy savings may be much smaller than the standard error for the model of an entire facility. For example, a typical data center might use about 5 MW (3,650 MWh per month), and a group of virtualized servers might save about 0.00057 MW (0.414 MWh per month). This is about a 0.01% difference and within the standard error of a typical model, and therefore undetectable when looking at facility data.

Second, newly created "budget" from the server consolidation effort will likely soon be utilized as the capabilities of the data center are expanded. This budget avails itself as available rack space (sq. ft.), power (kW), and cooling capacity (tons) freed-up by the removed computer servers. This tends to result in the maximal utilization of the limited power and cooling capacities of the space, creating no EECs (facility energy savings) because the facility's actual energy usage remains somewhat constant.

Third, records of many months of prior actual energy usage may not be available for computer servers. This is because they tend to be replaced rather frequently, typically about every 18 months.

This system-based modeling and EEC-determining process addresses the first and second issues by calculating the energy savings based on only the consolidated equipment. The second issue is further addressed by the fact that as a host server become more utilized, its updated baseline energy-use model can be generated beforehand and used to generate EECs based on the difference between pre- and post-consolidation energy performance models (i.e., by using the model-updating post-process described above). And the third issue is addressed because the energy performance model of the system to be consolidated can be gathered while subjecting it to various stresses and recording the energy usage. This can be done at-will and in short order, and it relies on no external data.

In addition, this system-based modeling and EEC-determining process avoids the potential problems associated with small overall efficiency improvements and those having a negligible impact on large facilities with single meters. The process captures savings where further construction or new installations will again raise overall consumption (i.e., by using the model-updating post-process described above). It also enables the near-instantaneous modeling of a system so that historical data stretching long periods into the past is not necessary.

In other exemplary embodiments of the present invention, there are provided new computer-based systems, computer-implemented methods, and computer program products that are similar to those of the above-described embodiments, except that they provide for more accurate and geographically precise estimates of energy savings. These systems and methods of these embodiments can be used effectively to provide a lower-level granularity for large facilities or individual systems.

Figure 20:
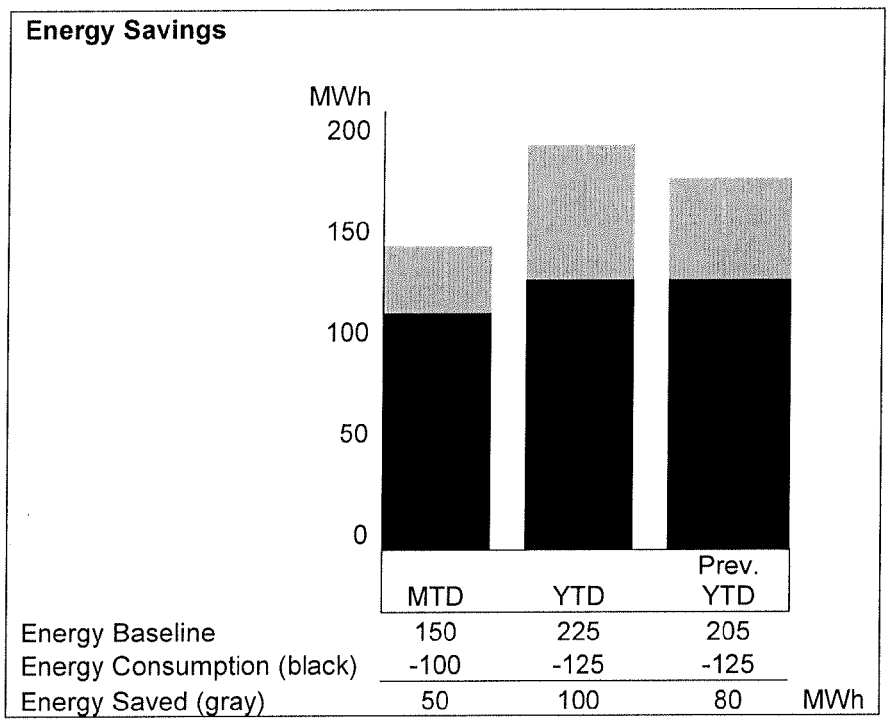
FIG. 20 depicts a chart from an exemplary screen display of a "dashboard" or summary page, showing energy savings.
Figure 21:
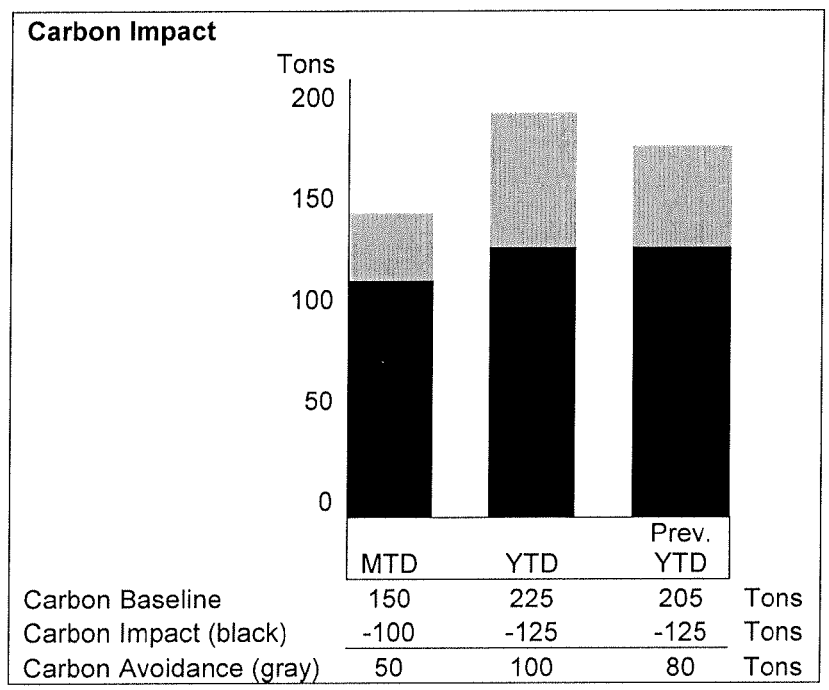
FIG. 21 depicts a chart from an exemplary screen display of a "dashboard" or summary page, showing carbon impact.

In one such exemplary embodiment, the estimated energy savings are converted to particulate reduction values (PRVs) based on the differing value of reductions in particulate matter by geographic region. The particulate matter being reduced (and that reduction valued) can be one of six particulates currently included in the eGRID (the Emissions and Generation Resource Integrated Database, by the Environmental Protection Agency of the U.S. government) or another chemical compound (whether strictly particulate, gaseous, liquid, or a composite) whose production and emission into the air is directly related to the production of energy. The six eGRID particulates are carbon dioxide ($CO_2$), nitrogen oxides ($NO_x$), sulfur dioxide ($SO_2$), mercury (Hg), methane ($CH_4$), and nitrous oxide ($N_2O$). Thus, in one embodiment the particulate whose reduction is being valued is carbon dioxide, so the displayed "dashboard" or summary page can show the energy savings (see FIG. 20), the carbon impact, i.e., the carbon dioxide reduction values (CRVs), based on the geographic region where the facility is located (see FIG. 21), or both. The CRVs can be calculated directly from the energy savings, after step 56 of FIG. 2, without ever calculating the EECs. Or they can be calculated based on the EECs after calculating them at step 58 of FIG. 2. The EECs are calculated from the energy savings, so either way the CRVs correspond to the energy savings.

In this example, the database stores particulate (e.g., carbon dioxide) factors 74 by geographic region, such as the data in the table of FIG. 22. This data can be stored in the same database 36 shown in FIG. 1, in a separate one, or over several databases, but for illustration purposes herein a single database 36 will be referred to. The geographic regions can be defined at the level desired, as long as the particulate factors are available at that level. In this example, the geographic regions are defined at the U.S. state level using data from the eGRID. In other embodiments, the geographic regions are the county level, the city level, a pre-defined intra-state level (e.g., the 28-county metropolitan Atlanta region), a pre-defined multi-state level (e.g., the six New England states), or a territory or other region of the U.S. or another country. In this example, the carbon dioxide factors 74 are multipliers that are multiplied by the EECs to determine the CRVs. In other embodiments, the particulate factors are otherwise applied (e.g., divided into) to the EECs or energy savings to determine the PRVs.

The determination and outputting of the more-geographically-specific PRVs provides benefits to the users. The energy savings and EECs are standardized estimates of the energy saved, without regards to the actual environmental impact that one unit of energy savings has in different geographic locations. Based on the data in the table of FIG. 22, for example, the carbon dioxide factor 74 for the state of Kentucky is 2.051 and that for California is 0.700. The carbon dioxide factors 74 used in this example are the average carbon dioxide emissions rates, so based only on this data it can be reasonably said that one kWh produced in Kentucky results in almost three times more carbon dioxide emitted than one kWh produced in California. Thus, the average value of eliminating the production of one kWh is almost three times higher in Kentucky than in California. This additional feature thereby provides for a different, more environmentally relevant, way to value and help implement reductions in energy consumption. And energy users can choose to purchase one EEC from a "dirtier" state because they can buy fewer EECs to get the same carbon reduction as would be achieved in a "cleaner" state.

In another such exemplary embodiment that more-accurately estimates energy savings, the energy savings are estimated based on additional facility conditions. In the example embodiments above, the facility condition data includes weather data, type of use, and occupancy and/or production data (e.g., number of widgets made). To provide for a more accurate estimation of energy savings, the number of facility conditions used is increased and their type is varied. The additional pre-defined facility conditions are programmed into the system to appear in a display screen to the user so that the user can select the most appropriate data types for their facility or system. If desired, the system can be set with a pre-defined maximum number (e.g., seven) of these facility conditions that can be selected for a given facility.

Examples of additional facility condition data (in addition to weather, use type, occupancy and/or production data) include the number of shifts, hours of operation, number of patients treated, number of hospital beds occupied, number of dormitory beds occupied, average number of cars in the parking lot, sales units (per day/hour/etc.), and sales revenues (per day/hour/etc.). These factors provide data not just on how much energy-consuming equipment is present and long it is running, but they can be used as a proxy to more accurately represent the occupancy (i.e., the approximate number of people inside the building and how long each was present each day). This can be readily appreciated with respect to for example the number of shifts and hours of operation. For sales units and sales revenues, these factors tend to provide in indication of foot traffic in a retail store, thereby providing more data for training the neural network model 50.

Thus, a manufacturing plant might vary the number of shifts it runs over time based on varying economic conditions, the construction of a second plant to relieve load on the first one, seasonal demand, or any number of other reasons. So being able to input not just that the type of usage is a manufacturing facility, but one that runs three shifts normally and over the summer reduces that to two shifts, provides a much more accurate estimation of energy savings. Similarly, a retail store might vary its hours of operation over time based on seasonal demand, varying customer preferences, or any number of other reasons. So being able to input not just that the type of usage is a retail store, but one whose hours are 8:00 a.m. to 8:00 p.m. Monday through Saturday and noon to 6:00 p.m. on Sunday, and during the holiday season has extended hours everyday until 10:00 p.m., provides a much more accurate estimation of energy savings.

In yet another such exemplary embodiment that more-accurately estimates energy savings, the systems and methods provide for estimating and displaying estimated energy savings (and/or EECs and/or PRVs) on a less-than-monthly basis. In previously developed embodiments, these were estimated and displayed on a monthly basis. This was in part because the baseline and actual energy consumed by the facility were measured on a monthly basis (by monthly meter reading) and because the baseline and actual facility condition data used were higher-level data (i.e., they did not include the more-detailed facility condition data just described). But this embodiment uses more granular-level baseline and actual facility condition data (e.g., number of shifts, hours of operation, sales units, and sales revenues) and baseline and actual energy consumed data on a less-than-monthly basis. As used herein, a "less-than-monthly" basis includes per week, day, hour, minute, or second, or per pre-defined portion thereof. In one embodiment, the baseline and actual energy consumed data is measured every 15 minutes and accumulated into hourly totals. This can be implemented by using smart meters for remote meter reading on a quarter-hour basis. In other embodiments, the baseline and actual energy consumed data is measured every hour by using meter reading on an hourly basis. And in yet other embodiments, the baseline and actual energy consumed data is measured every minute or even every pre-defined portion of a minute for substantially real-time energy savings measurement and valuation. (Though less accurate, monthly meter reading can be used along with an algorithm for converting the monthly usage to estimated hourly usage.) In this way, the system and method can estimate and display energy data (e.g., energy usage, energy savings, EECs, and/or CRVs) on a less-than monthly basis (e.g., on an hourly basis). So instead of estimating the energy data in 12 time periods (months) each year, the system and method can be used to estimate the energy data in 8,760 time periods each year (24 hours/day×365 days/year=8,760 hours/year).

When the energy data is estimated on an hourly (or other less-than-monthly) basis, this permits valuing the energy savings on a more-detailed level. Many electric utilities designate increased-demand times for electricity, with these times being specific hours of the day. During these increased-demand times, energy consumption is peaking beyond the utility's regular energy production capability, so it must buy energy at substantially higher rates, start up higher-cost old/standby generation plants/units, etc., to meet the increased demand (e.g., on the hottest afternoons of the year). These increased-demand times are stored in the same database 36 shown in FIG. 1, in a separate one, or over several databases, but for illustration purposes herein a single database 36 will be referred to. After the energy savings have been determined on an hour-by-hour basis at step 56 of FIG. 2, or after the EECs have been determined on an hour-by-hour basis at step 58 of FIG. 2, then the system applies a corresponding designation to the energy data based on the increased-demand times stored in the database 36 for the utility supplying electricity to the facility. The identity of the utility can be selected by the user in a menu input screen, input by the system administrator, etc.

Figure 23:
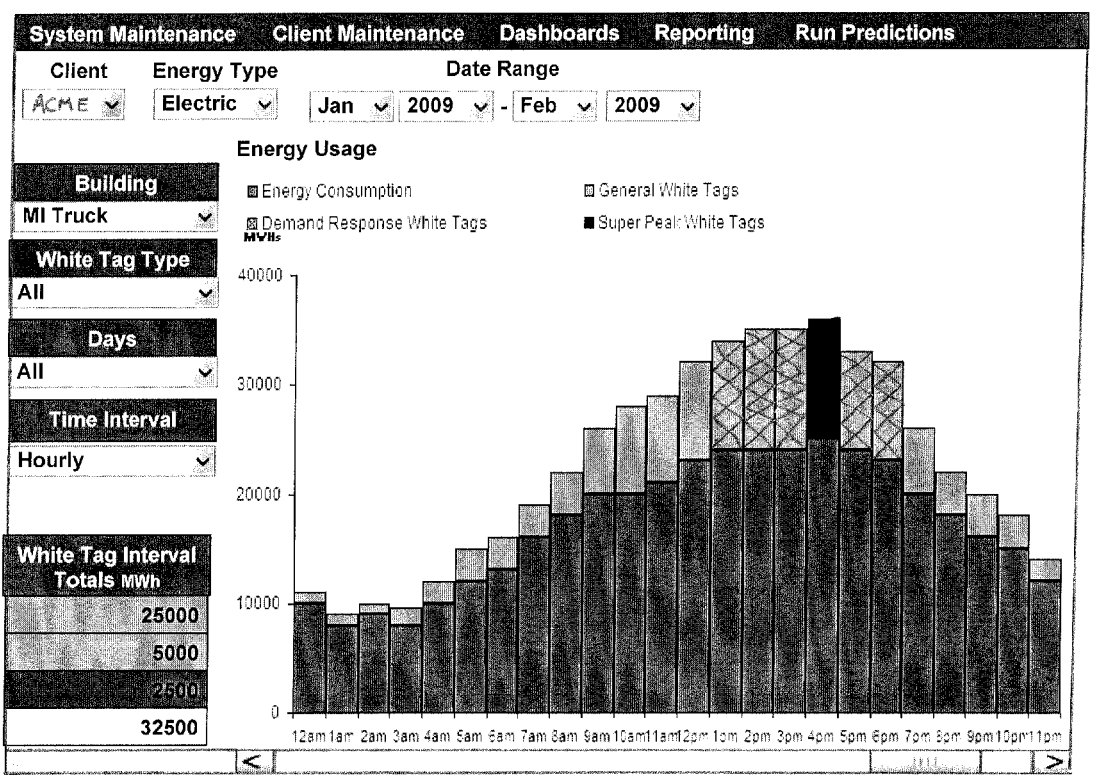
FIG. 23 depicts an exemplary screen display of a "dashboard" or summary page, showing energy savings on an hour-by-hour basis including during designated increased-demand times.

For example, FIG. 23 depicts an exemplary screen display of a "dashboard" or summary page showing energy savings on an hour-by-hour basis including during designated increased-demand times. These increased-demand times are referred to as "Demand" times for higher-than-normal demand periods and "Super-Peak" for the highest-demand periods for illustration purposes, but the number and names of these designations can be selected differently if desired. Thus, in this example, the electricity-supplying utility has designated 4:00 p.m. to 5:00 p.m. as a "Super-Peak" period, and 1:00 p.m. to 4:00 p.m. and 5:00 p.m. to 7:00 p.m. as "Demand" periods. So the system and method function to apply those designations to the display of EECs on an hour-by-hour basis. In this way, the user can easily see the increased value of the EECs during increased-demand times (relative to "General," i.e., non-increased-demand times) and make better-informed decisions based on this more-precise information (e.g., the "Super-Peak" EECs can be sold at a higher cost to reflect their higher value). It will be understood that this feature can be implemented on an even more granular level, for example, by designating increased-demand EECs on a quarter-hour or minute basis.

It is to be understood that this invention is not limited to the specific devices, methods, conditions, and/or parameters described and/or shown herein, and that the terminology used herein is for the purpose of describing particular embodiments by way of example only. Thus, the terminology is intended to be broadly construed and is not intended to be limiting of the claimed invention. In addition, as used in the specification including the appended claims, the singular forms "a," "an," and "the" include the plural, plural forms include the singular, and reference to a particular numerical value includes at least that particular value, unless the context clearly dictates otherwise. Furthermore, any methods described herein are not intended to be limited to the sequence of steps described but can be carried out in other sequences, unless expressly stated otherwise herein.

Moreover, while certain embodiments are described above with particularity, these should not be construed as limitations on the scope of the invention. It should be understood, therefore, that the foregoing relates only to exemplary embodiments of the present invention, and that numerous changes may be made therein without departing from the spirit and scope of the invention as defined by the following claims.

What is claimed is:

1. A computer-implemented method for determining energy savings in an energy-consuming facility, comprising:
   inputting baseline facility condition data to an artificial intelligence model generator, the baseline facility condition data representing baseline facility conditions during a first time interval before an energy conservation measure;
   inputting baseline energy consumed by the facility during the first time interval;
   the artificial intelligence model generator generating an artificial intelligence model in response to the baseline facility condition data and baseline energy consumed, the artificial intelligence model modeling how facility energy consumption responds to facility conditions;
   inputting actual facility condition data to the artificial intelligence model, the actual facility condition data representing actual facility conditions during a second time interval after the energy conservation measure;
   inputting actual energy consumed by the facility during the second time interval;
   the artificial intelligence model outputting, in response to the actual facility condition data, a projection of energy that would have been consumed under the baseline facility conditions but for the energy conservation measure;
   computing energy savings, wherein the energy savings are defined by a difference between the actual energy consumed during the second time interval and the estimate of energy that would have been consumed but for the energy conservation measure; and
   generating particulate reduction values (PRVs) corresponding to the computed energy savings.

2. The method claimed in claim 1, wherein the step of inputting baseline facility condition data comprises querying a weather agency database in response to a geographic location of the facility.

3. The method claimed in claim 1, wherein:
   the step of inputting baseline facility condition data comprises inputting baseline occupancy and production data and weather conditions experienced during the first time interval; and
   the step of inputting actual facility condition data comprises inputting actual occupancy and production data and weather conditions experienced during the second time interval.

4. The method claimed in claim 1, wherein:
   the step of inputting baseline facility condition data comprises inputting baseline data selected from the group consisting of occupancy, production data, number of shifts, hours of operation, sales units, and sales revenues; and
   the step of inputting actual facility condition data comprises inputting actual data selected from the group consisting of occupancy, production data, number of shifts, hours of operation, sales units, and sales revenues.

5. The method claimed in claim 1, wherein the step of generating PRVs comprises querying a database storing particulate factors by geographic region and applying to the computed energy savings the corresponding particulate factor for the geographic region where the facility is located.

6. The method claimed in claim 1, further comprising generating energy efficiency certificates (EECs) corresponding to the computed energy savings, wherein the PRVs correspond to the EECs.

7. A computer program product for determining energy savings in an energy-consuming facility, comprising a non-transitory computer-readable medium encoded with computer-executable instructions for performing the method of claim 1.

8. A system for determining energy savings in an energy-consuming facility, comprising:
   a database for storing facility condition data representing facility conditions during a first time interval before energy conservation measures and during a second time interval after energy conservation measures, the database further for storing energy data representing energy consumed by the facility during each time interval;
   an artificial intelligence model generator for generating an artificial intelligence model modeling how facility energy consumption responds to facility conditions, wherein the artificial intelligence model generator generates the artificial intelligence model in response to baseline facility condition data representing facility conditions during the first time interval and in response to baseline energy consumed by the facility during the first time interval;
   an artificial intelligence engine for producing an estimate of energy that would have been consumed under the baseline facility conditions but for the energy conservation measures, the artificial intelligence engine producing the estimate in response to actual facility condition data representing actual facility conditions during the second time interval; and
   a user interface for outputting particulate reduction values (PRVs) corresponding to energy savings, wherein the energy savings are a difference between the actual energy consumed during the second time interval and the estimate of energy that would have been consumed but for the energy conservation measures.

9. The system claimed in claim 8, wherein the facility condition data comprises occupancy, production data, and weather conditions experienced by the facility during each time interval.

10. The system claimed in claim 8, wherein the facility condition data is selected from the group consisting of occupancy, production data, number of shifts, hours of operation, sales units, and sales revenues.

11. The system claimed in claim 8, wherein the database further stores particulate factors by geographic region for applying, to the computed energy savings, the corresponding particulate factor for the geographic region where the facility is located to determine the PRVs for outputting by the user interface.

12. The system claimed in claim 8, wherein the wherein the PRVs correspond to energy efficiency certificates (EECs) that also correspond to the computed energy savings.

13. A computer-implemented method for determining energy savings in an energy-consuming facility, comprising:
   inputting baseline facility condition data to an artificial intelligence model generator, the baseline facility condition data representing baseline facility conditions during a first time interval before an energy conservation measure;

inputting baseline energy consumed by the facility on a less-than-monthly basis during the first time interval;

the artificial intelligence model generator generating an artificial intelligence model in response to the baseline facility condition data and baseline energy consumed, the artificial intelligence model modeling how facility energy consumption responds to facility conditions;

inputting actual facility condition data to the artificial intelligence model, the actual facility condition data representing actual facility conditions during a second time interval after the energy conservation measure;

inputting actual energy consumed by the facility on a less-than-monthly basis during the second time interval;

the artificial intelligence model outputting, in response to the actual facility condition data, a projection of energy that would have been consumed on a less-than-monthly basis under the baseline facility conditions but for the energy conservation measure;

computing energy savings on a less-than-monthly basis, wherein the energy savings are defined by a difference between the actual energy consumed on a less-than-monthly basis during the second time interval and the estimate of energy that would have been consumed on a less-than-monthly basis but for the energy conservation measure; and generating energy efficiency certificates (EECs) corresponding to the computed energy savings, particulate reduction values (PRVs) corresponding to the energy savings, or both, on a less-than-monthly basis.

14. The method claimed in claim 13, wherein the step of inputting baseline facility condition data comprises querying a weather agency database in response to a geographic location of the facility.

15. The method claimed in claim 13, wherein:
the step of inputting baseline facility condition data further comprises inputting baseline occupancy and production data and weather conditions experienced during the first time interval; and
the step of inputting actual facility condition data further comprises inputting actual occupancy and production data and weather conditions experienced during the second time interval.

16. The method claimed in claim 13, wherein:
the step of inputting baseline facility condition data further comprises inputting baseline data selected from the group consisting of occupancy, production data, number of shifts, hours of operation, sales units, and sales revenues; and
the step of inputting actual facility condition data further comprises inputting actual data selected from the group consisting of occupancy, production data, number of shifts, hours of operation, sales units, and sales revenues.

17. The method claimed in claim 13, wherein the step of computing energy savings comprises computing energy savings on an hour-by-hour basis, wherein the energy savings are defined by a difference between the actual energy consumed on an hour-by-hour basis during the second time interval and the estimate of energy that would have been consumed on an hour-by-hour basis but for the energy conservation measure.

18. The method claimed in claim 13, wherein the step of generating EECs, PRVs, or both further comprises querying a database storing increased-demand times for the energy supplier and designating the EECs, PRVs, or both corresponding to the increased-demand times as increased-demand EECs, PRVs, or both.

19. A computer program product for determining energy savings in an energy-consuming facility, comprising a non-transitory computer-readable medium encoded with computer-executable instructions for performing the method of claim 13.

20. A system for determining energy savings in an energy-consuming facility, comprising:
a database for storing facility condition data representing facility conditions during a first time interval before energy conservation measures and during a second time interval after energy conservation measures, the database further for storing energy data representing energy consumed by the facility on a less-than-monthly basis during each time interval;
an artificial intelligence model generator for generating an artificial intelligence model modeling how facility energy consumption responds to facility conditions, wherein the artificial intelligence model generator generates the artificial intelligence model in response to baseline facility condition data representing facility conditions during the first time interval and in response to baseline energy consumed by the facility on a less-than-monthly basis during the first time interval;
an artificial intelligence engine for producing an estimate of energy that would have been consumed on a less-than-monthly basis under the baseline facility conditions but for the energy conservation measures, the artificial intelligence engine producing the estimate in response to actual facility condition data representing actual facility conditions during the second time interval; and
a user interface for outputting energy efficiency certificates (EECs) corresponding to the energy savings, particulate reduction values (PRVs) corresponding to the energy savings, or both, on a less-than-monthly basis, wherein the less-than-monthly basis energy savings are a difference between the actual energy consumed on a less-than-monthly basis during the second time interval and the estimate of energy that would have been consumed on a less-than-monthly basis but for the energy conservation measures.

21. The system claimed in claim 20, wherein the facility condition data comprises occupancy, production data, and weather conditions experienced by the facility during each time interval.

22. The system claimed in claim 20, wherein the facility condition data is selected from the group consisting of occupancy, production data, number of shifts, hours of operation, sales units, and sales revenues.

23. The system claimed in claim 20, wherein:
the artificial intelligence engine produces an estimate of energy that would have been consumed on an hour-by-hour basis under the baseline facility conditions but for the energy conservation measures; and
the user interface outputs EECs corresponding to the energy savings, PRVs corresponding to the energy savings, or both, on an hour-by-hour basis.

24. The system claimed in claim 20, wherein the database further stores increased-demand times per supplier of energy to the facility for use in designating the EECs, PRVs, or both corresponding to the increased-demand times as increased-demand EECs, PRVs, or both.

* * * * *